(12) United States Patent  
Ikeno et al.

(10) Patent No.: US 7,884,978 B2
(45) Date of Patent: Feb. 8, 2011

(54) IMAGE READING APPARATUS, LIGHT INTENSITY CONTROL CIRCUIT, AND LIGHT INTENSITY CONTROL METHOD

(75) Inventors: Takahiro Ikeno, Seto (JP); Shingo Fujiwara, Nagoya (JP); Tetsuya Kato, Chiryu (JP); Hirofumi Oguri, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1044 days.

(21) Appl. No.: 11/624,413

(22) Filed: Jan. 18, 2007

(65) Prior Publication Data

US 2007/0165288 A1    Jul. 19, 2007

(30) Foreign Application Priority Data

Jan. 18, 2006   (JP)   ............................. 2006-009878

(51) Int. Cl.
H04N 1/46        (2006.01)
H04N 1/04        (2006.01)

(52) U.S. Cl. ...................... 358/509; 358/514; 358/475; 358/484; 358/483

(58) Field of Classification Search ................ 358/509, 358/505, 506, 512–514, 475, 483, 484, 487; 250/227.11, 227.28, 578.1, 208.1, 205, 234–236; 362/800; 355/67–70; 382/312, 318, 319
See application file for complete search history.

(56) References Cited

U.S. PATENT DOCUMENTS 6,545,777 B1*   4/2003   Amimoto ..................... 358/509
6,785,026 B1*   8/2004   Terajima et al. ............. 358/509

FOREIGN PATENT DOCUMENTS

JP          9214675 A      8/1997
JP       2003163792 A      6/2003

* cited by examiner

Primary Examiner—Cheukfan Lee
(74) Attorney, Agent, or Firm—Baker Botts L.L.P.

(57) ABSTRACT

An aspect of the invention provides an image reading apparatus including: first and second light emitters that emit lights; a light guide unit that guides the lights emitted from the first and second light emitters to irradiate a document with the light; a photoelectric conversion unit that converts reflected light from the document into an image signal; and a control unit that controls the first light emitter to emit light for a first time period in a unit time period and controls the second light emitter to emit light for a second time period misaligned from the first time period in the unit time period.

18 Claims, 22 Drawing Sheets

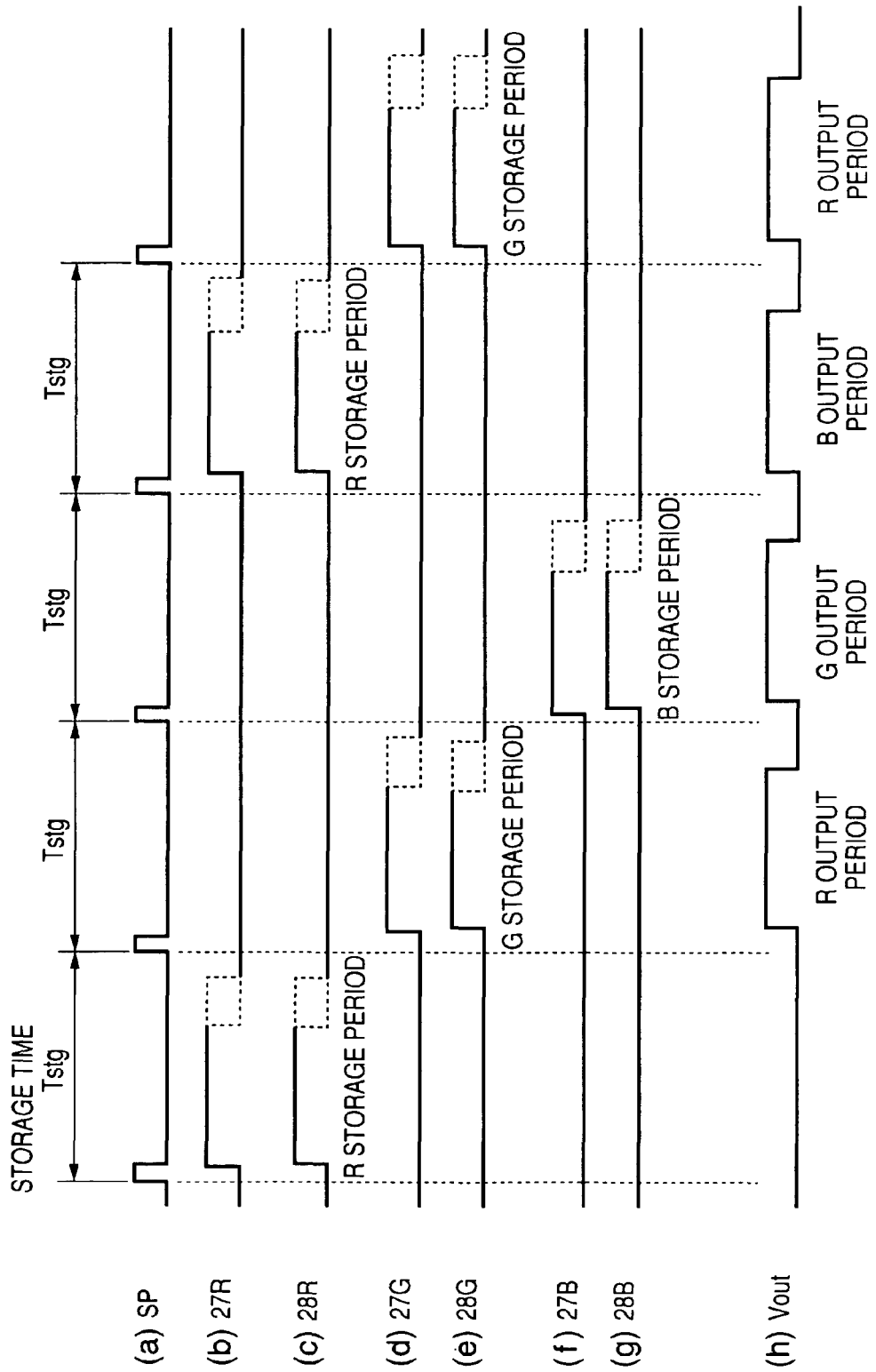

IMAGE READING APPARATUS, LIGHT INTENSITY CONTROL CIRCUIT, AND LIGHT INTENSITY CONTROL METHOD

CROSS-REFERENCE TO RELATED APPLICATION

This application claims priority from Japanese Patent Application No. 2006-009878, filed on Jan. 18, 2006, the entire subject matter of which is incorporated herein by reference.

TECHNICAL FIELD

Aspects of the present invention relate to an image reading apparatus that uses a contact image sensor (CIS) having a plurality of image sensor integrated circuit (IC) chips arranged in a line, a light intensity control circuit, and a light intensity control method.

BACKGROUND

A light source device uses a light emitting diode (LED) for document illumination of an image reading apparatus, such as a facsimile machine or an electronic copy machine, which electrically reads and processes image information of a document, a book, or the like.

Conventionally, in an image forming apparatus, an LED array having a plurality of LED chips arranged in a line is widely used in order to obtain a linear illumination along a CIS. Recently, with high luminance of the LED chips, JP-A-9-214675 suggests a light source device for document illumination that expands light in a linear shape using a cylindrical light guide member and a pair of LED lamps arranged at both end surfaces of the light guide member.

The above-described light source device for document illumination includes an LED lamp 26a facing one incident surface 25a of a light guide member 25 and an LED lamp 26b facing the other incident surface 25b of the light guide member 25 (see FIGS. 3 and 4). In both LED lamps 26a and 26b, each turn-on period in an illumination cycle is adjusted (duty adjustment) based on the start of the illumination cycle as shown in FIG. 23. That is, turn-on timings of the LED lamps 26a, 26b in an illumination cycle are the same. Accordingly, as shown in FIG. 14 as the related art, the turn-on periods of the LED lamps 26a and 26b are aligned with each other when scanning in a sub scanning direction. Then, there is a period when the document is not illuminated while scanning a range of a feed amount for a maximum resolution in the sub scanning direction. The period of non-illumination causes lack of image data when an image reading apparatus reads the document.

SUMMARY

According to an aspect of the present invention, an image reading apparatus includes: first and second light emitters that emit lights; a light guide unit that guides the lights emitted from the first and second light emitters to irradiate a document with the light; a photoelectric conversion unit that converts reflected light from the document into an image signal; and a control unit that controls the first light emitter to emit light for a first time period in a unit time period and controls the second light emitter to emit light for a second time period misaligned from the first time period in the unit time period.

According to an aspect of the invention, a light intensity control circuit for an image reading apparatus that includes first and second light emitters that emit lights, a light guide unit that guides the lights emitted from the first and second light emitters to irradiate a document with the light, and a photoelectric conversion unit that converts reflected light from the document into an image signal, includes: a control unit that controls the first light emitter to emit light for a first time period in a unit time period and controls the second light emitter to emit light for a second time period misaligned from the first time period in the unit time period.

According to an aspect of the invention, a light intensity control method includes: emitting a first light from a first light emitter for a first time period in a unit time period; emitting a second light from a second light emitter for a second time period misaligned from the first time period in the unit time period; guiding the emitted lights to irradiate a document with the light; and converting reflected light of the emitted lights from the document into an image signal.

BRIEF DESCRIPTION OF THE DRAWINGS

FIG. 23 is a timing chart showing the operation of a known image reading apparatus.

DETAILED DESCRIPTION

Hereinafter, aspects of the invention will be described in detail with reference to the drawings.

First Aspect

Figure 1:
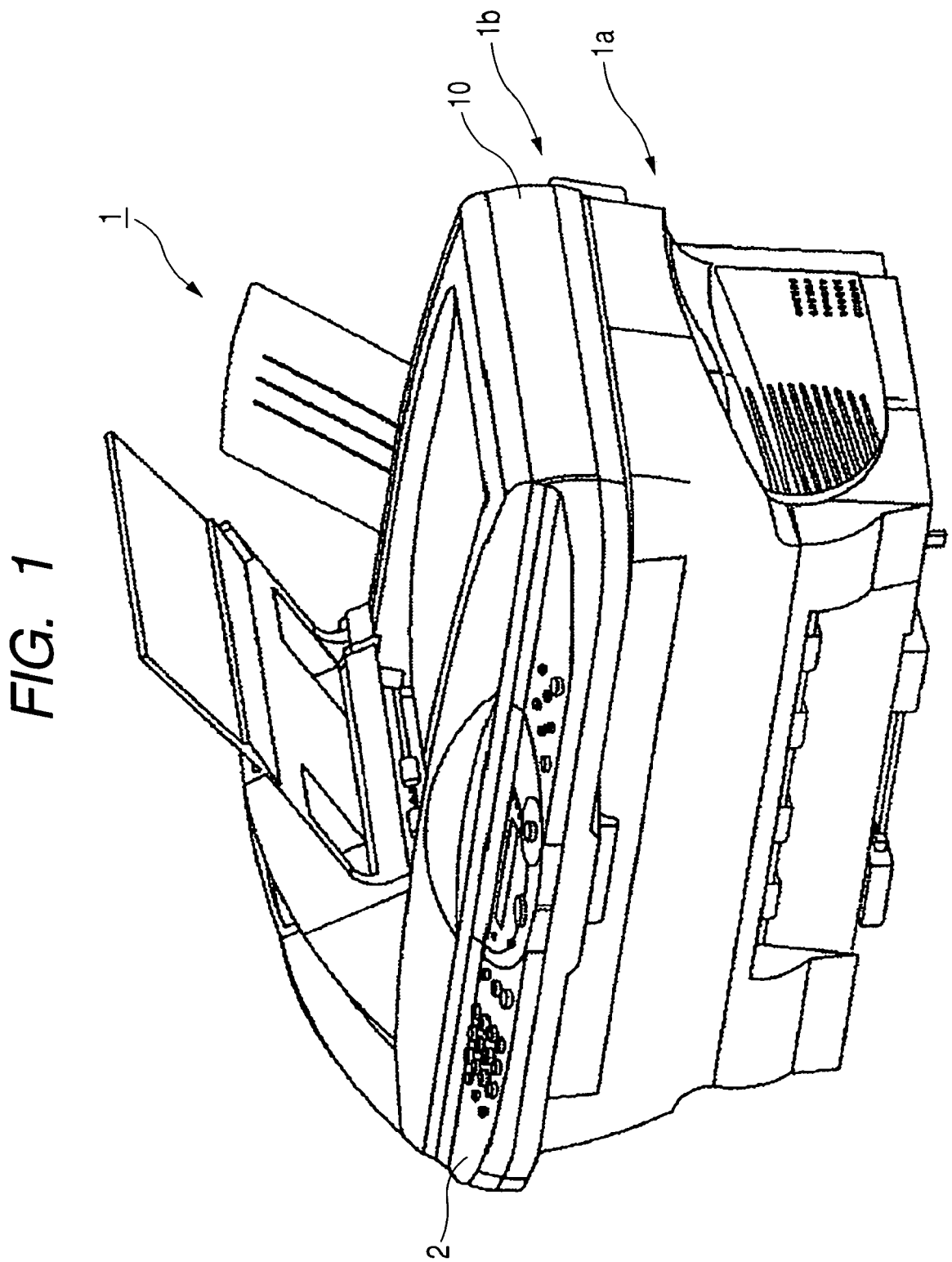
FIG. 1 is an exterior view showing a complex machine including an image reading apparatus according to a first aspect.

FIG. 1 is an exterior view of a complex machine 1 including an image reading apparatus 10 according to a first aspect of the invention. The complex machine 1 includes a lower main body 1a and an upper main body 1b rotably attached to the lower main body 1a to form a clamshell structure. The upper main body 1b includes the image reading apparatus 10. Further, the upper main body 1b includes an operating panel 2 on a front side thereof. Moreover, the complex machine 1 includes an image forming apparatus (laser printer), in addition to the image reading apparatus 10. The image forming apparatus does not directly relate to the invention, and more detailed description will be omitted.

Figure 2:
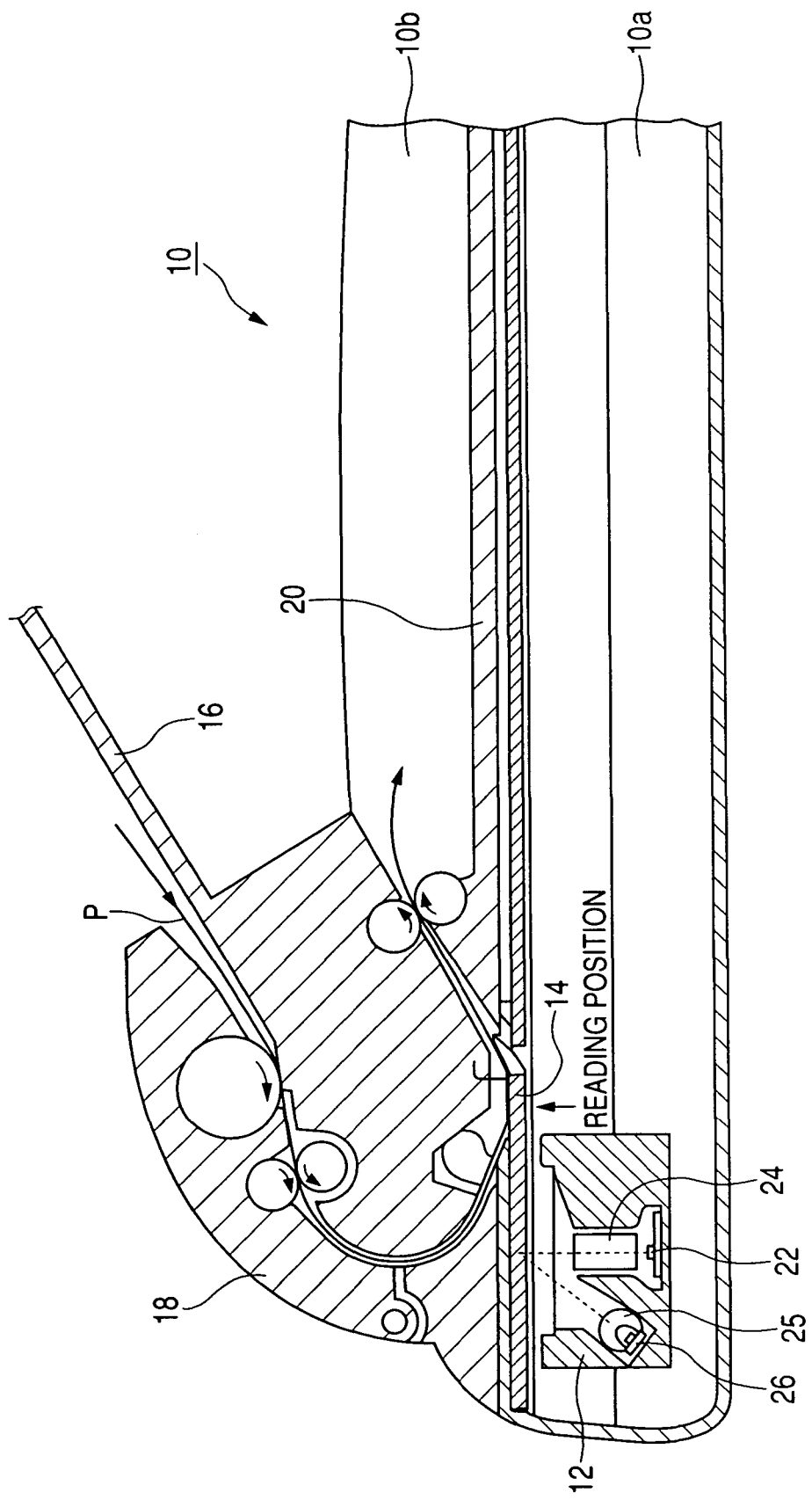
FIG. 2 is a cross-sectional view showing the image reading apparatus according to the first aspect.

FIG. 2 is a cross-sectional view of the image reading apparatus 10. The image reading apparatus 10 has both a flat bed mechanism (FB) and an automatic document feeder (ADF). The image reading apparatus 10 includes a cover portion 10b openably attached to a flat bed portion 10a to form a clamshell structure.

In the image reading apparatus 10, the flat bed portion 10a includes a reading head 12, a first platen glass 14, and the like. Further, the cover portion 10b includes a document supply tray 16, a document feed device 18, a document discharge tray 20, and the like.

The reading head 12 includes a CIS 22, a one-power optical system 24, a light guide member 25, and LED lamps 26 (26a and 26b). To read an image, the LED lamps 26 (26a and 26b) irradiate light onto a document P at a reading position. Then, the one-power optical system 24 focuses the reflected light onto the CIS 22. Further, the reading head 12 is driven leftwards and rightwards in FIG. 2 by a driving mechanism (not shown). When actually reading the document P, the reading head 12 moves to a position where the CIS 22 is located immediately below the reading position.

Figure 3:
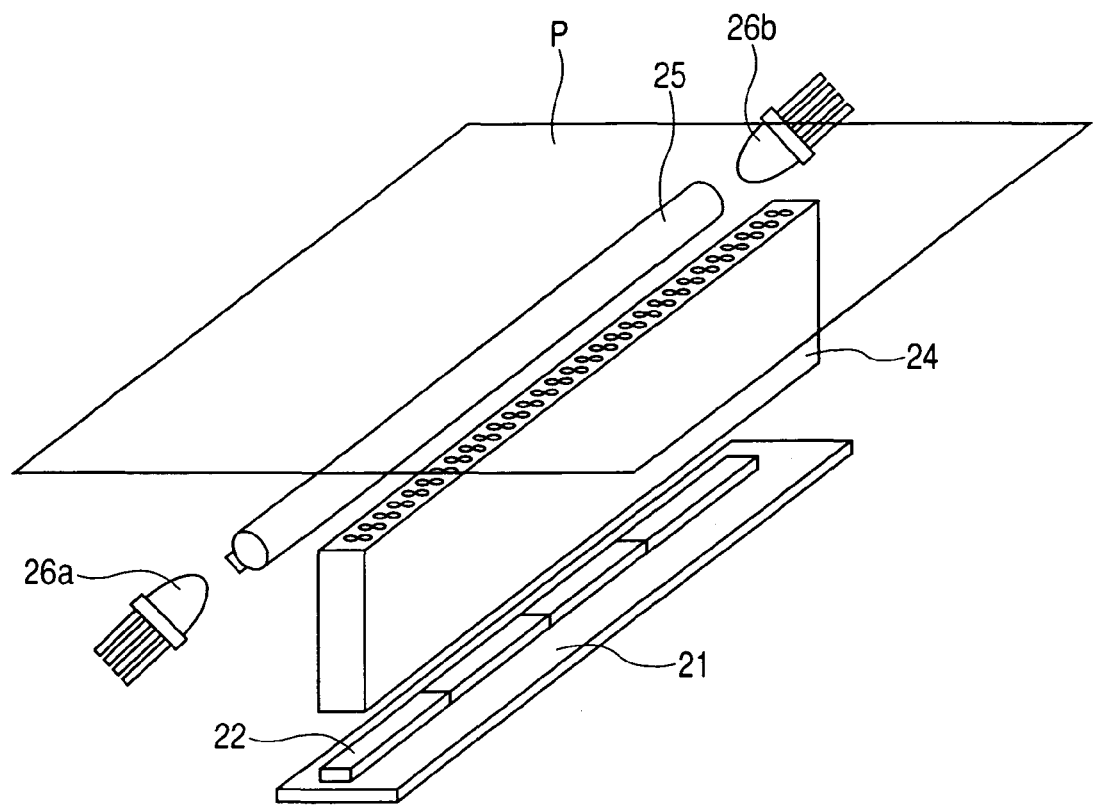
FIG. 3 is a block diagram showing the image reading apparatus according to the first aspect.

FIG. 3 is a perspective view showing parts of the image reading apparatus 10 according to the first aspect in detail. The image reading apparatus 10 includes a substrate 21, a CIS 22 formed on the substrate 21, a one-power optical system 24 having a SELFOC lens, a cylindrical light guide member 25 disposed along the one-power optical system 24, and a pair of LED lamps 26a and 26b respectively disposed to face end surfaces of the light guide member 25.

Figure 4:
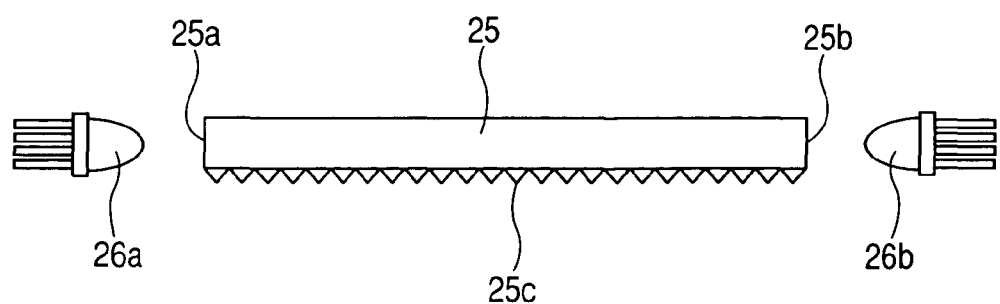
FIG. 4 is a block diagram showing parts of the image reading apparatus shown in FIG. 3.

As shown in FIG. 4, the light guide member 25 has a circular shape in section, and is formed of a transmissive material, such as acryl resin. Both surfaces of the light guide member 25 serve as incident surfaces 25a and 25b, on which light emitted from the pair of LED lamps 26a and 26b is incident, and also serve as reflecting surfaces that prevent light from being emitted from the light guide member 25. The reflecting surfaces are formed by depositing a metal, such as aluminum or the like, on both end surfaces of the light guide member 25 or coating a light diffusion reflective material. Alternatively, the reflecting surfaces may be provided as separate members. Further, the light guide member 25 has a reflective region 25c that reflects and diffuses light propagating the light guide member 25 and extracts light from outside the light guide member 25. The reflective region 25c is formed by allowing one peripheral surface of the light guide member 25 to have a minute saw-teeth shape and then depositing a metal, such as aluminum or the like, thereon.

Figure 5A:
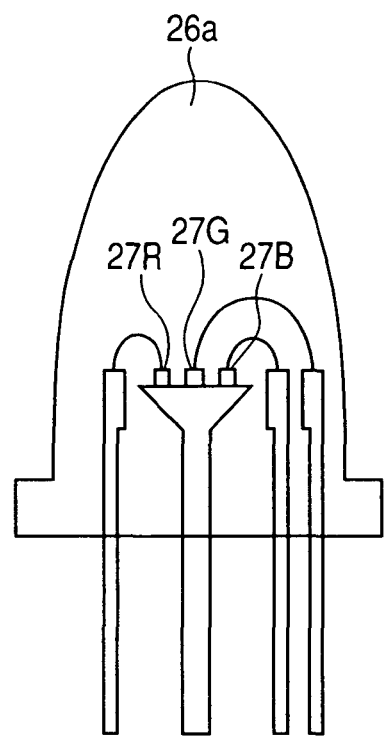
FIGS. 5A and 5B are diagrams showing the configuration of LED lamps shown in FIGS. 3 and 4.
Figure 5B:
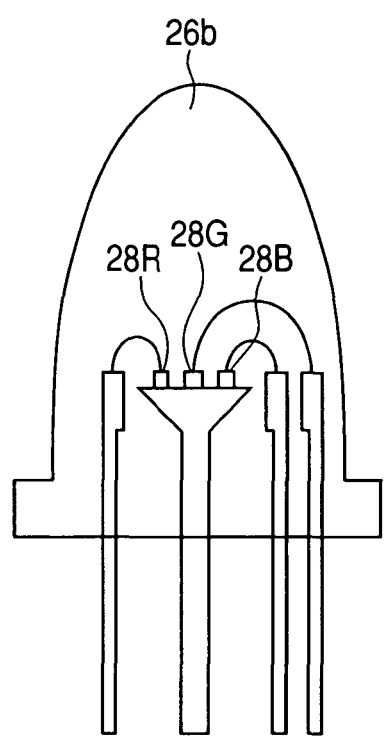

FIGS. 5A and 5B are expanded views of the pair of LED lamps 26a and 26b. A left LED lamp 26a includes red (R), green (G), and blue (B) LED chips 27R, 27G, and 27B having different emission waveforms bonded on a metal lead and sealed with resin in a lens shape. A right LED lamp 26b also includes red (R), green (G), and blue (B) LED chips 28R, 28G, and 28B having different emission waveforms bonded on a metal lead and sealed with resin in a lens shape. The pair of LED lamps 26a and 26b respectively have R, G, and B LED chips 27R, 27G, and 27B and R, G, and B LED chips 28R, 28G, and 28B, and thus full color image reading is implemented. Moreover, in the LED chips 27R, 27G, and 27B and the LED chips 28R, 28G, and 28B, it may be preferable for the light sources having the same emission waveform, that is, the LED chip 27R and the LED chip 28R, the LED chip 27G and the LED chip 28G, or the LED chip 27B and 28B to have close emission efficiency.

According to the configuration of the image reading apparatus 10, each of lights emitted from the LED lamps 26a and 26b is incident on the light guide member 25 from the incident surfaces 25a and 25b of the light guide member 25. The incident light propagates through the light guide member 25 while being repeatedly reflected in the light guide member 25, reaches opposing surfaces of the incident surfaces 25a and 25b, and are reflected at the opposing surfaces again. When light is repeatedly reflected and then is incident on the reflective region 25c, light is reflected at the reflective region 25c. Then, light is emitted outside to an emission surface facing the reflective region 25c and irradiates the document P in a linear shape. Reflected light from the document P is focused on the CIS 22 formed on the substrate 21 by the one-power optical system 24 and then is converted into an image signal.

Figure 6:
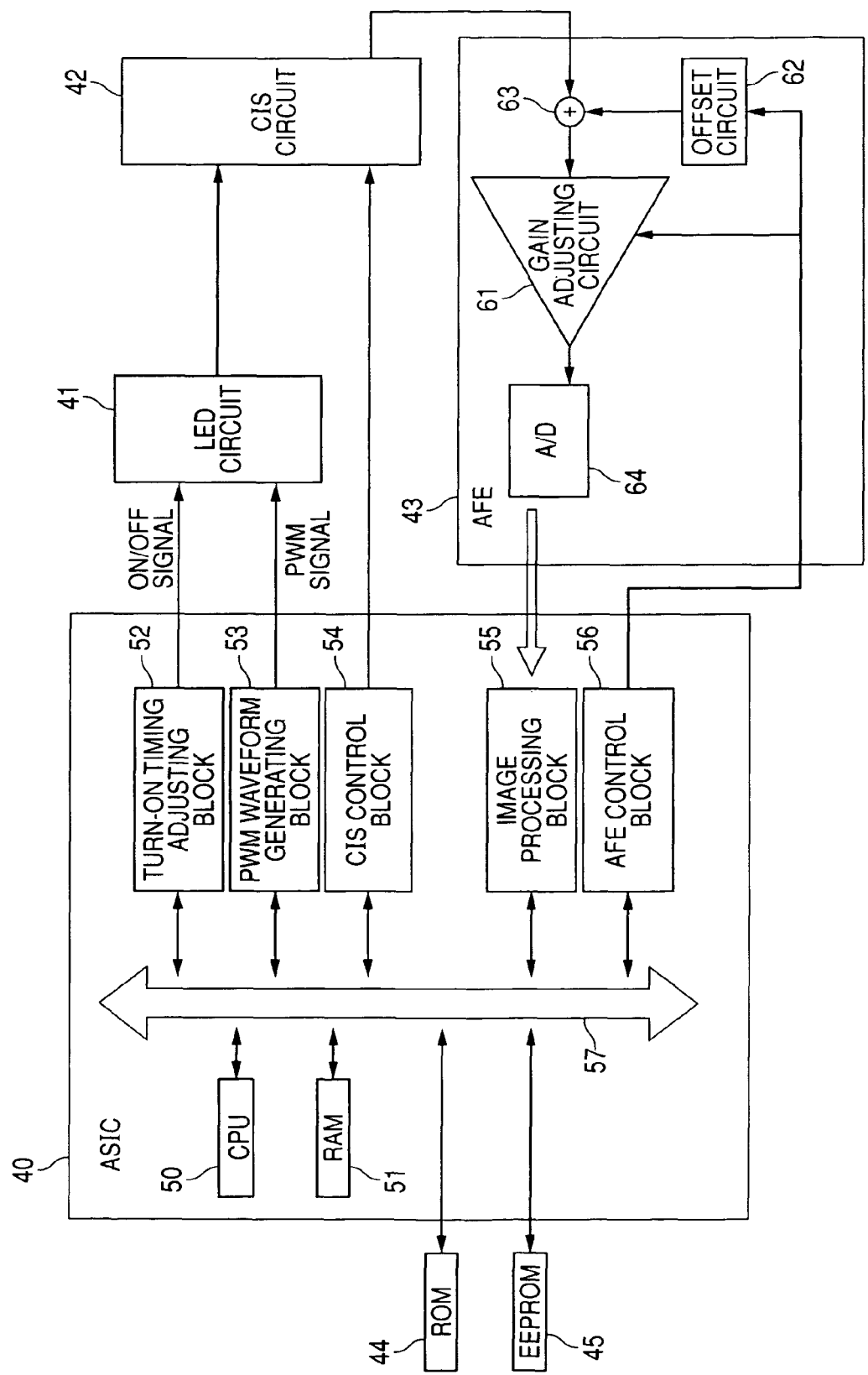
FIG. 6 is a circuit block diagram showing the electrical configuration of the image reading apparatus according to the first aspect.

FIG. 6 is a circuit block diagram showing the electrical configuration of the image reading apparatus 10. The image reading apparatus 10 mainly includes an Application Specific Integrated Circuit (ASIC) 40, an LED circuit 41, a CIS circuit 42, an Analog Front End (AFE) 43, a Read Only Memory (ROM) 44, and an Electrically Erasable and Programmable Read Only Memory (EEPROM) 45.

The ASIC 40 includes a Central Processing Unit (CPU) 50, a Random Access Memory (RAM) 51, a turn-on timing adjusting block 52, a Pulse Width Modulation (PWM) waveform generating block 53, a CIS control block 54, an image processing block 55, an AFE control block 56, and a bus 57 connecting them.

The turn-on timing adjusting block 52 changes duty value DUTY=(maximum turn-on time of LED per color)÷(time for reading one-line for three colors)×100 so as to adjust turn-on timing of the LED chips 27R, 27G, and 27B in the left LED lamp 26a and the LED chips 28R, 28G, and 28B in the right LED lamp 26b.

Figure 8:
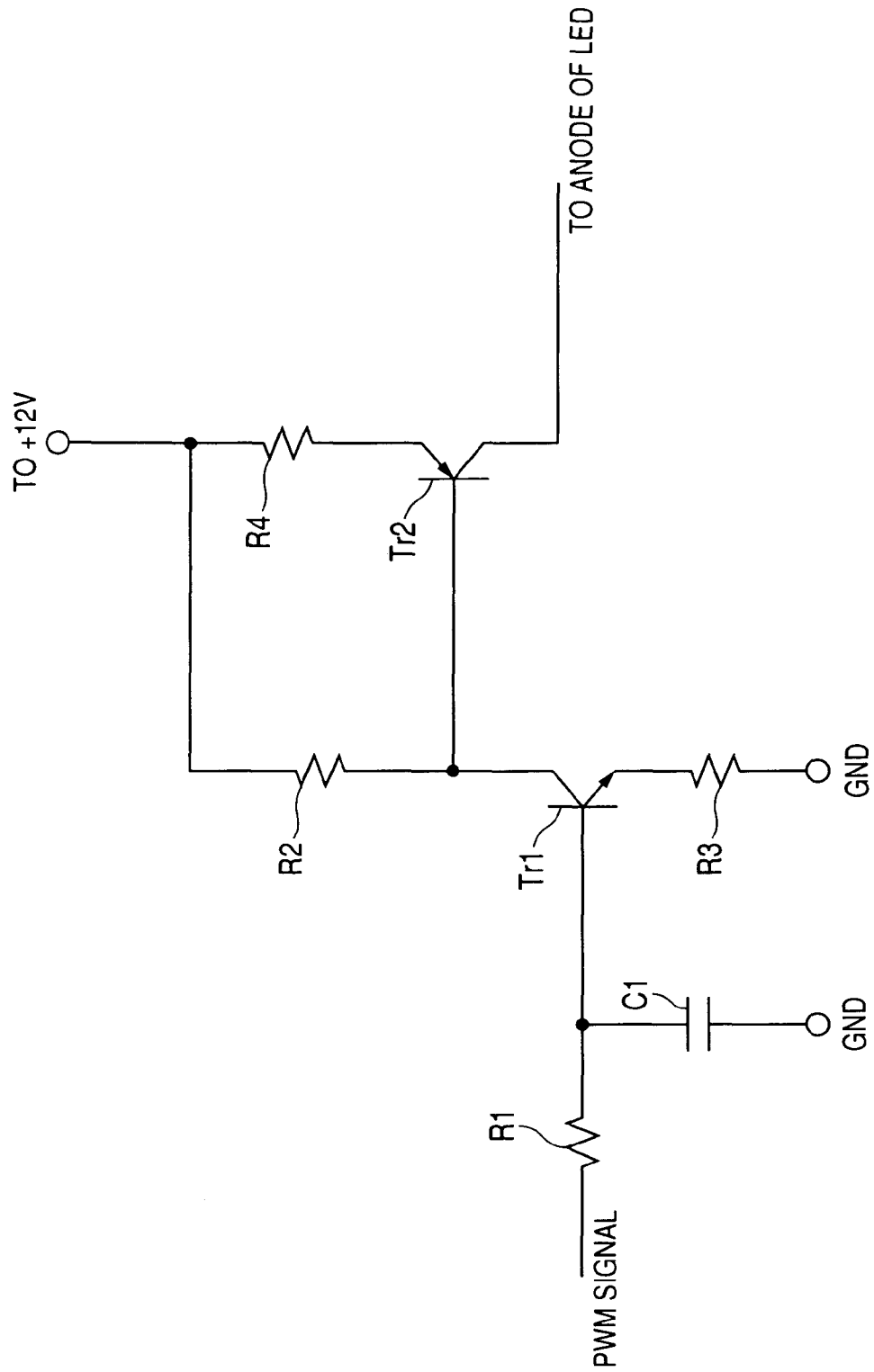
FIG. 8 is a diagram showing in detail a current adjusting circuit shown in FIG. 7.

The PWM waveform generating block 53 generates a PWM signal, integrates the PWM signal using an RC integration circuit having a resistor R1 and a capacitor C1 (see FIG. 8) of a current adjusting circuit 70 (see FIG. 15) in the LED circuit 41, and generates a constant current in a resistor R3 (see FIG. 8). Then, a constant current is generated in a resistor R4 (see FIG. 8). The constant current in the resistor R4 becomes an LED current. Accordingly, the LED current is adjusted by the PWM waveform generating block 53.

The AFE 43 includes a gain adjusting circuit 61, an offset circuit 62, an addition circuit 63, and an Analog/Digital (A/D) conversion circuit 64.

Figure 7:
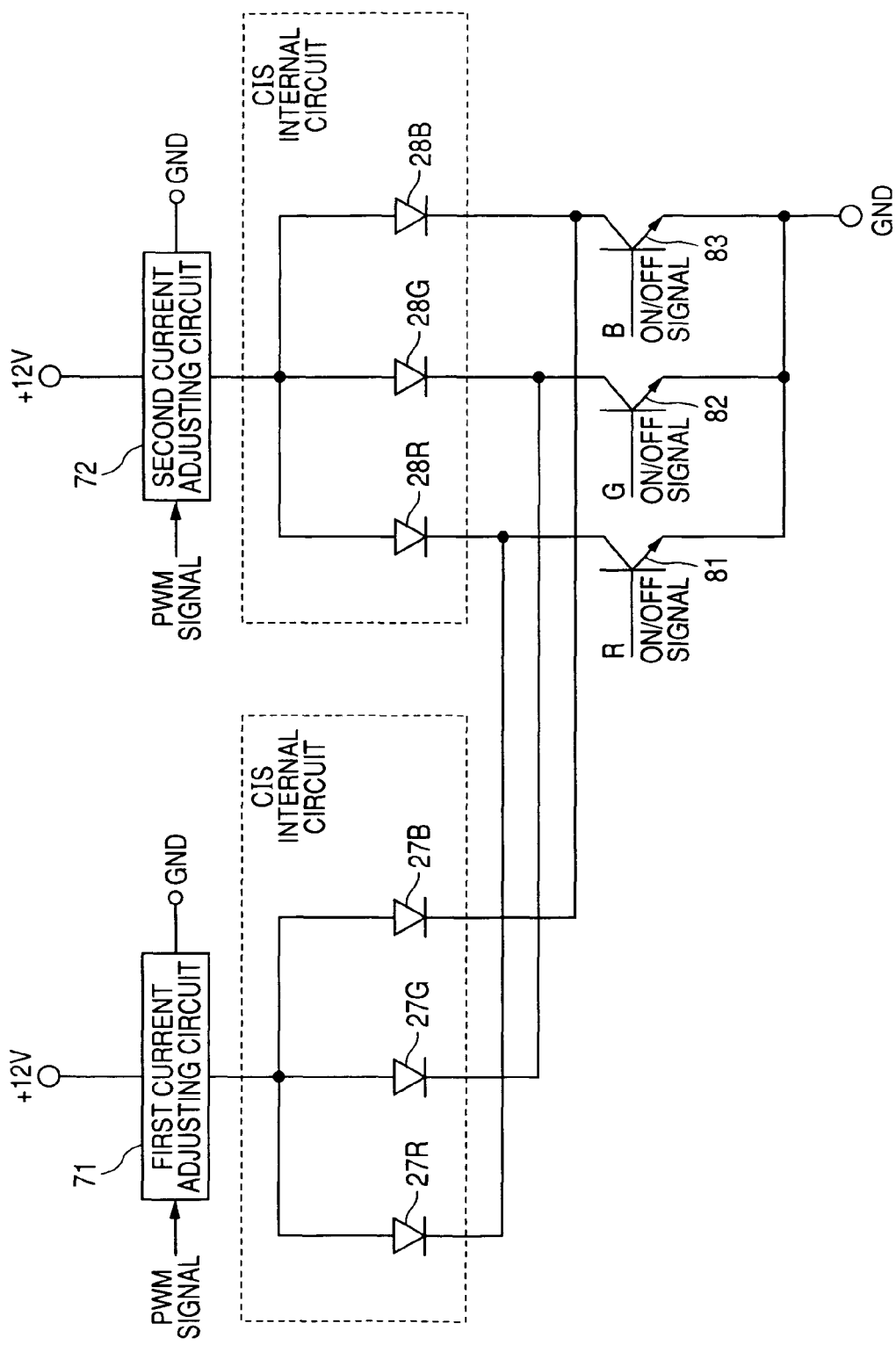
FIG. 7 is a circuit diagram showing the electrical configuration of an LED circuit shown in FIG. 6.

FIG. 7 is a circuit diagram showing the electrical configuration of the LED circuit 41 in the image reading apparatus 10 according to the first aspect. The LED circuit 41 has: a first current adjusting circuit 71, to which a PWM signal is input; the LED chips 27R, 27G, and 27B of the left LED lamp 26a, anodes of which are connected to the first current adjusting circuit 71; a second current adjusting circuit 72, to which the PWM signal is input; the LED chips 28R, 28G, and 28B of the right LED lamp 26b, anodes of which are connected to the second current adjusting circuit 72; an NPN-type control transistor 81 of which a collector is connected to cathodes of the LED chip 27R and the LED chip 28R; an NPN-type control transistor 82 of which a collector is connected to cathodes of the LED chip 27G and the LED chip 28G; and an NPN-type control transistor 83, of which a collector is connected to cathodes of the LED chip 27B and the LED chip 28B. The first current adjusting circuit 71 and the second current adjusting circuit 72 are connected to a +12 V power source and a ground GND. On/off signals are input to bases of the control transistors 81, 82, and 83. Emitters of the control transistors 81, 82, and 83 are connected to the ground.

FIG. 8 is a circuit diagram showing in detail a current adjusting circuit having the first current adjusting circuit 71 and the second current adjusting circuit 72 in detail. The current adjusting circuit includes a resistor R1, one end of which is applied with the PWM signal; an NPN-type transistor Tr1, a base of which is connected to the other end of the resistor R1; a capacitor C1 that is interposed between the base of the transistor Tr1 and the ground; a resistor R2 that is interposed between a collector of the transistor Tr1 and the +12 V power source; a resistor R3 that is interposed between an emitter of the transistor Tr1 and the ground; a transistor Tr2, a base of which is connected to the collector of the transistor Tr1 and an emitter of which is connected to the anode of the LED chip; and a resistor R4 that is interposed between a collector of the transistor Tr2 and the +12 V power source. The current adjusting circuit turns on the transistors Tr1 and Tr2 when the PWM signal is turned on, thereby applying a current from the +12 V power source to the LED chip. The current adjusting circuit adjusts a turn-on timing of an LED connected thereto and a current amount to the LED to adjust an intensity of the light emitted from the LED.

Figure 9:
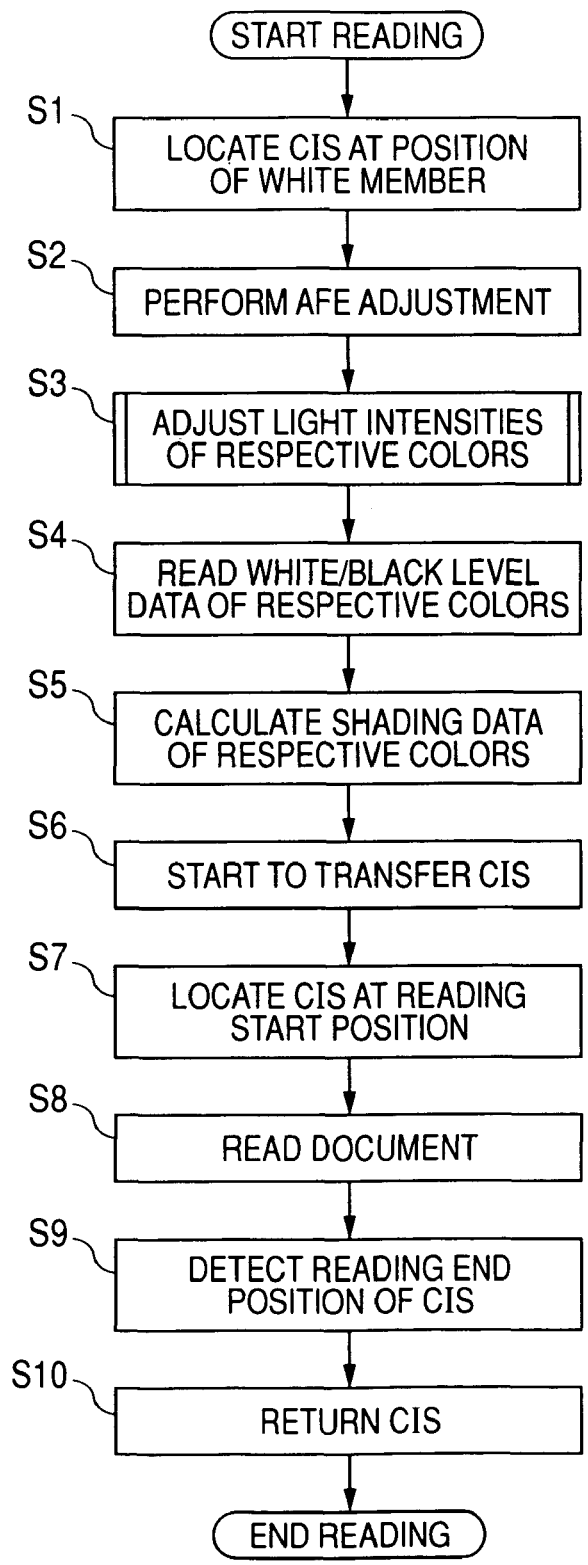
FIG. 9 is a flowchart showing a main reading control processing of the image reading apparatus according to the first aspect.

FIG. 9 is a flowchart showing a main reading control processing of the image reading apparatus 10 according to the first aspect.

Figure 10:
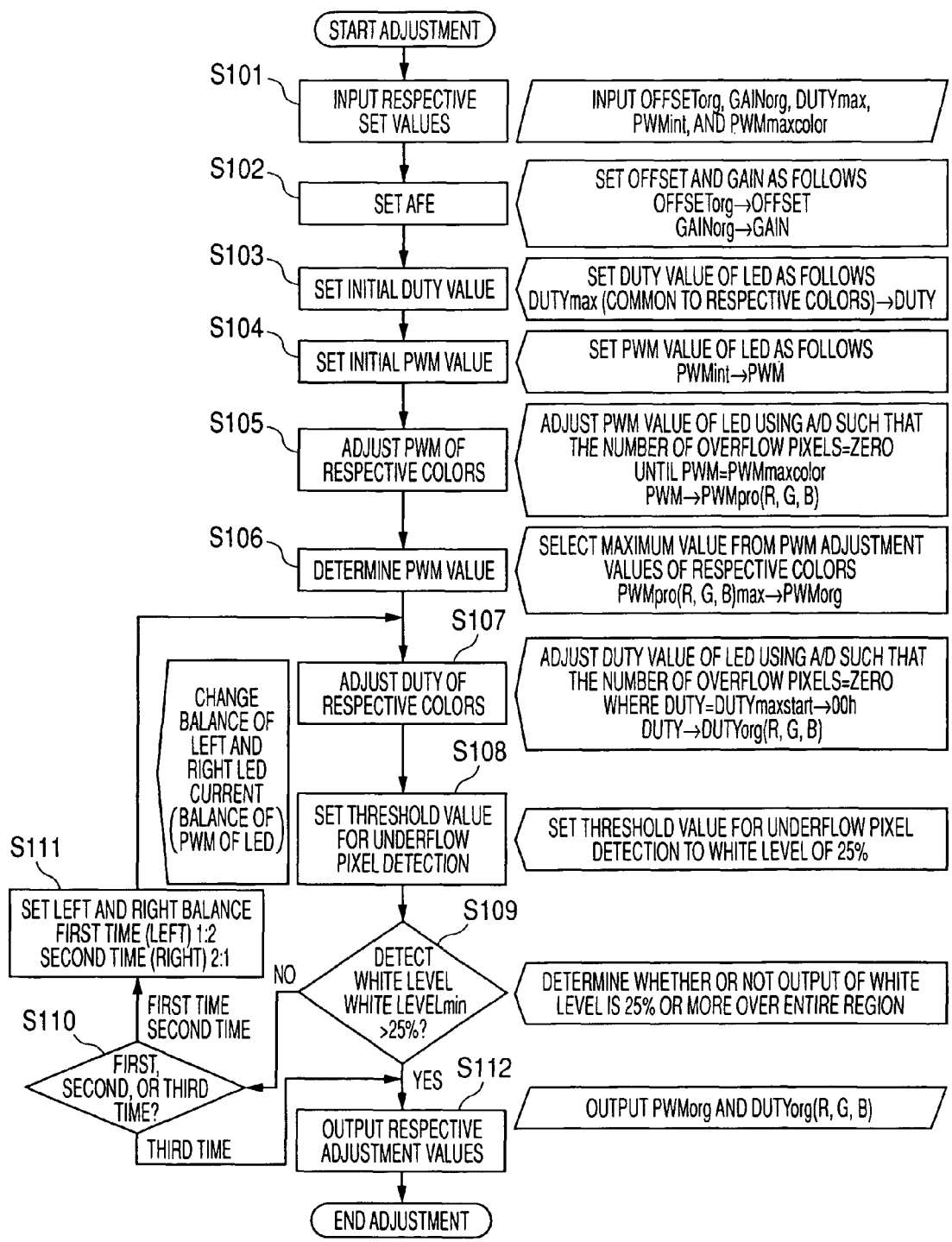
FIG. 10 is a flowchart showing a light intensity adjustment processing of each color shown in FIG. 9.

FIG. 10 is a flowchart showing a light intensity adjustment processing of each color shown in FIG. 9.

Next, the operation of the image reading apparatus 10 according to the first aspect having the above-described configuration will be described with reference to FIGS. 1 to 10.

When a reading operation of the image reading apparatus 10 starts, the CPU 50 controls the CIS control block 54 to move the CIS circuit 42 (the reading head 12) to a white member position (home position) (Step Si of FIG. 9).

Next, the CPU 50 controls the AFE control block 56 to perform adjustment of the AFE 43 (Step S2 of FIG. 9).

Next, the CPU 50 controls the turn-on timing adjusting block 52 and the PWM waveform generating block 53 to perform light intensity adjustment for respective colors of the LED chips 27R, 27G, and 27B in the LED lamp 26a and the LED chips 28R, 28G, and 28B in the LED lamp 26b (Step S3 of FIG. 9).

Next, the CPU 50 reads white and black level data for respective colors of the LED chips 27R, 27G, and 27B in the LED lamp 26a and the LED chips 28R, 28G, and 28B in the LED lamp 26b (Step S4 of FIG. 9).

Next, the CPU 50 calculates shading data for respective colors of the LED chips 27R, 27G, and 27B in the LED lamp 26a and the LED chips 28R, 28G, and 28B in the LED lamp 26b (Step S5 of FIG. 9).

Next, the CPU 50 controls the CIS control block 54 to start to move the CIS circuit 42 (the reading head 12) (Step S6 of FIG. 9).

Next, the CPU 50 controls the CIS control block 54 to locate the CIS circuit 42 (the reading head 12) at a reading start position (Step S7 of FIG. 9).

Next, the CPU 50 controls the CIS control block 54 to read the document P by CIS circuit 42 (the reading head 12) (Step S8 of FIG. 9).

Next, the CPU 50 controls the CIS control block 54 to detect a reading end position of the CIS circuit 42 (reading head 12) (Step S9 of FIG. 9).

Next, the CPU 50 controls the CIS control block to return the CIS circuit 42 (the reading head 12) to the white member position (home position) (Step S10 of FIG. 9).

In such a manner, the CPU 50 performs a reading processing on the document P by the CIS circuit 42 (the reading head 12).

Next, the light intensity adjustment (Step S3) for respective colors of the LED chips 27R, 27G, and 27B in the LED lamp 26a and the LED chips 28R, 28G, and 28B in the LED lamp 26b will be described in detail with reference to FIG. 10.

First, the CPU 50 receives respective set values of an adjustment offset value OFFSETorg, an adjustment gain value GAINorg, a maximum duty value DUTYmax, an initial pulse width modulation value PWMint, and a maximum pulse width modulation value PWMmaxcolor from the EEPROM 45 (Step S101 of FIG. 10). The adjustment offset value OFFSETorg is a voltage value adjusted such that a black level value (a minimum value as an image output signal) adjusted in the previous AFE adjustment (Step S2 of FIG. 9) becomes lower than a reference voltage of the A/D conversion circuit 64. This voltage value is digitized and stored in the EEPROM 45.

Next, the CPU 50 controls the AFE control block 56 to set the adjustment offset value OFFSETorg to an offset value OFFSET of the offset circuit 62 and set the adjustment gain value GAINorg to a gain value GAIN of the gain adjusting circuit 61 so as to set the AFE 43 (Step S102 of FIG. 10).

Next, the CPU 50 controls the PWM waveform generating block 53 to set the maximum duty value DUTYmax to be the same as to respective colors to the duty values DUTY of the LED chips 27R, 27G, and 27B and the LED chips 28R, 28G, and 28B (Step S103 of FIG. 10). Since the movement of the document P in a period when the LED lamps 26a and 26b are not turned on causes a lack of read image data at that period, it is necessary to make the turn-off periods of the LED lamps 26a and 26b as small as possible. Accordingly, the duty values are set to the maximum duty value DUTYmax when the turn-on period is longest.

Next, the CPU 50 controls the PWM waveform generating block 53 to set the initial pulse width modulation value PWMint to pulse width modulation values PWM of the respective colors of the LED chips 27R, 27G, and 27B and the LED chips 28R, 28G, and 28B (Step S104 of FIG. 10).

Next, the CPU 50 controls the PWM waveform generating block 53 to adjust the pulse width modulation values PWM of the respective colors of the LED chips 27R, 27G, and 27B and the LED chips 28R, 28G, and 28B to provisional pulse width modulation values PWMpro(R, G, B) of the respective colors of the LED chips 27R, 27G, and 27B and the LED chips 28R, 28G, and 28B (Step S105 of FIG. 10). Specifically, the pulse width modulation values PWM of the respective colors of the LED chips 27R, 27G, and 27B and the LED chips 28R, 28G, and 28B are adjusted by using the A/D conversion circuit 64 such that the number of overflow pixels becomes zero. That is, the pulse width modulation values PWM are set to the provisional pulse width modulation values PWMpro(R, G, B) of the respective colors of the LED chips 27R, 27G, and 27B and the LED chips 28R, 28G, and 28B. The pulse width modulation values PWM is as large as the maximum pulse width modulation value PWMmaxcolor. Specifically, ASIC 40 includes a counter that counts the number of values representing the maximum of the A/D values, the turn-on period is set to have the maximum value. At first, the pulse width modulation value PWM (current amount) is set to have the maximum value PWMmaxcolor. Then, the pulse width modulation value PWM decreases, and the adjustment ends when the count value of the counter becomes zero.

Next, the CPU 50 determines the pulse width modulation values PWM of the respective colors of the LED chips 27R, 27G, and 27B and the LED chips 28R, 28G, and 28B through the PWM waveform generating block 53 (Step S106 of FIG. 10). Specifically, the maximum provisional pulse width modulation value PWMpromax among adjustment pulse width modulation values PWMpro of the respective colors of the LED chips 27R, 27G, and 27B and the LED chips 28R, 28G, and 28B is selected and is set to an adjustment pulse width modulation value PWMorg. Specifically, the adjustment of Step S105 is performed three times for three colors of R, G, and B, and the pulse width modulation values PWM of the respective colors are obtained. Then, the maximum value among the obtained pulse width modulation values PWM, that is, the pulse width modulation value PWM having the maximum current amount at the maximum duty value DUTYmax, that is, a color representing the darkest output, is selected and set as the adjustment pulse width modulation value PWMorg (the pulse width modulation value is just one, and the pulse modulation value for the first current adjusting circuit 71 and that for the second current adjusting circuit 72 are the same). With this configuration, the adjustment of other colors can be performed by decreasing the current amount while at the maximum duty value DUTYmax. Therefore, the adjustment can be performed with the maximum turn-on period at first.

Next, the CPU 50 controls the turn-on timing adjusting block 52 to adjust the duty values DUTY of the respective colors of the LED chips 27R, 27G, and 27B and the LED chips 28R, 28G, and 28B to adjustment duty values DUTYorg (R, G, B) (Step S107 of FIG. 10). Specifically, the duty values DUTY of the LED lamps 26a and 26b are adjusted using the A/D conversion circuit 64 such that the number of overflow pixels becomes zero. That is, the duty values DUTY are set to the adjustment duty values DUTYorg(R, G, B). However, the duty values DUTY ranges from 00 h to the maximum duty value DUTYmax. Here, the duty values DUTY (turn-on periods) of the respective colors of the LED chips 27R, 27G, and 27B and the LED chips 28R, 28G, and 28B are determined with the adjustment pulse width modulation value PWMorg at Step S106. Specifically, the adjustment is performed using the counter described at Step S105 such that the count value becomes zero. First, at Step S106, the adjustment pulse width modulation value PWMorg is set. Then, the maximum duty value DUTYmax is set, and the duty value DUTY decreases until the counter becomes zero. The duty value DUTY is stored when the counter becomes zero. This step is performed three times for three colors, and then three duty values DUTY are obtained. Moreover, for one color, the duty value DUTY is adjusted to the maximum duty value DUTYmax, and thus it may not be necessary to perform the adjustment. Even though the adjustment is performed, the duty value DUTY is immediately determined, and thus it does not matter. Meanwhile, the selection of colors is not performed. For this reason, a processing does not need to be changed according to color, and thus a processing circuit is simplified.

Next, the CPU 50 sets a threshold value for underflow pixel detection of the image processing block 55 to a white level of 25% (Step S108 of FIG. 10). The counter that counts the number of maximum values of the A/D values described at Steps S105 and S107 is also provided relative to minimum values of the A/D values so as to count the number of values representing the minimum among the A/D values. A/D values that are counted by the counter can be determined, and the number of values that are smaller than the determined A/D values are counted. The "threshold value for underflow pixel detection" represents the A/D values for counting by the counter.

Next, since the CIS circuit 42 (the reading head 12) is located at the white member position (home position) at Step S1 of FIG. 9, the CPU 50 controls the image processing block 55 to read an image of a white member by the CIS circuit 42 through the AFE 43 so as to detect the white level (WHITE LEVELmin>25%) (Step S109 of FIG. 10). Specifically, it is determined whether or not output of the white level over the entire region is 25% or more.

When the output of the white level is not 25% or more over the entire region (Step S109 of FIG. 10: NO), the CPU 50 determines that this determination at Step S109 is the first, second, or third time (Step S110 of FIG. 10).

When it is determined that the determination is the first or second time, the CPU 50 controls the PWM waveform generating block 53 to adjust a balance between the pulse width modulation values PWM of left and right LED lamps 26a and 26b for the respective colors of the LED chips 27R, 27G, and 27B and the LED chips 28R, 28G, and 28B (Step S111 of FIG. 10). Specifically, the balance between the left and right LED current (left and right balance) is changed such that a ratio of the left and right LED current is 1:2 at the first time and 2:1 at the second time. As for the left and right balance, typically, the adjustment is performed on an assumption that left and right outputs are the same. In addition, the adjustment may be performed when the minimum value of the white level is less than 25%. In the LED circuit 41 of FIG. 7, the left and right balance is adjusted by making a difference between current values of the first current adjusting circuit 71 and the second current adjusting circuit 72. Further, the determination of the left or right side may not be performed. The left side is adjusted as dark at the first time, and the right side is adjusted as dark at the second time. As for the ratio '1:2 at the first time (left)', the adjustment is performed so that the current amount for the left LED is half of the current amount for the right LED (in the pulse width modulation value PWM, a half excluding a base-emitter voltage VBE of the transistor Tr). The base-emitter voltage VBE of the transistor Tr is stored in the EEPROM 45 or the like in advance. After Step S111, the CPU 50 returns the processing to Step S107.

When it is determined that the output of white level is 25% or more over the entire region (Step S109 of FIG. 10: YES) or when setting of the left and right balance (Step S111 of FIG.

10) has been performed two times already (Step S110 of FIG. 10: third time), the CPU 50 outputs respective adjustment values of the adjustment pulse width modulation value PWMorg and the adjustment duty value DUTYorg(R, G, B) (Step S112 of FIG. 10).

According to the first aspect, the current flowing in one LED lamp 26a and the current flowing in the other LED lamp 26b can be independently controlled. In addition, the red LED chips 27R and 28R in one LED lamp 26a and the other LED lamp 26b, the green LED chips 27G and 28G in one LED lamp 26a and the other LED lamp 26b, and the blue LED chips 27B and 28B in one LED lamp 26a and the other LED lamp 26b can be independently turned on/off.

Second Aspect

Figure 11:
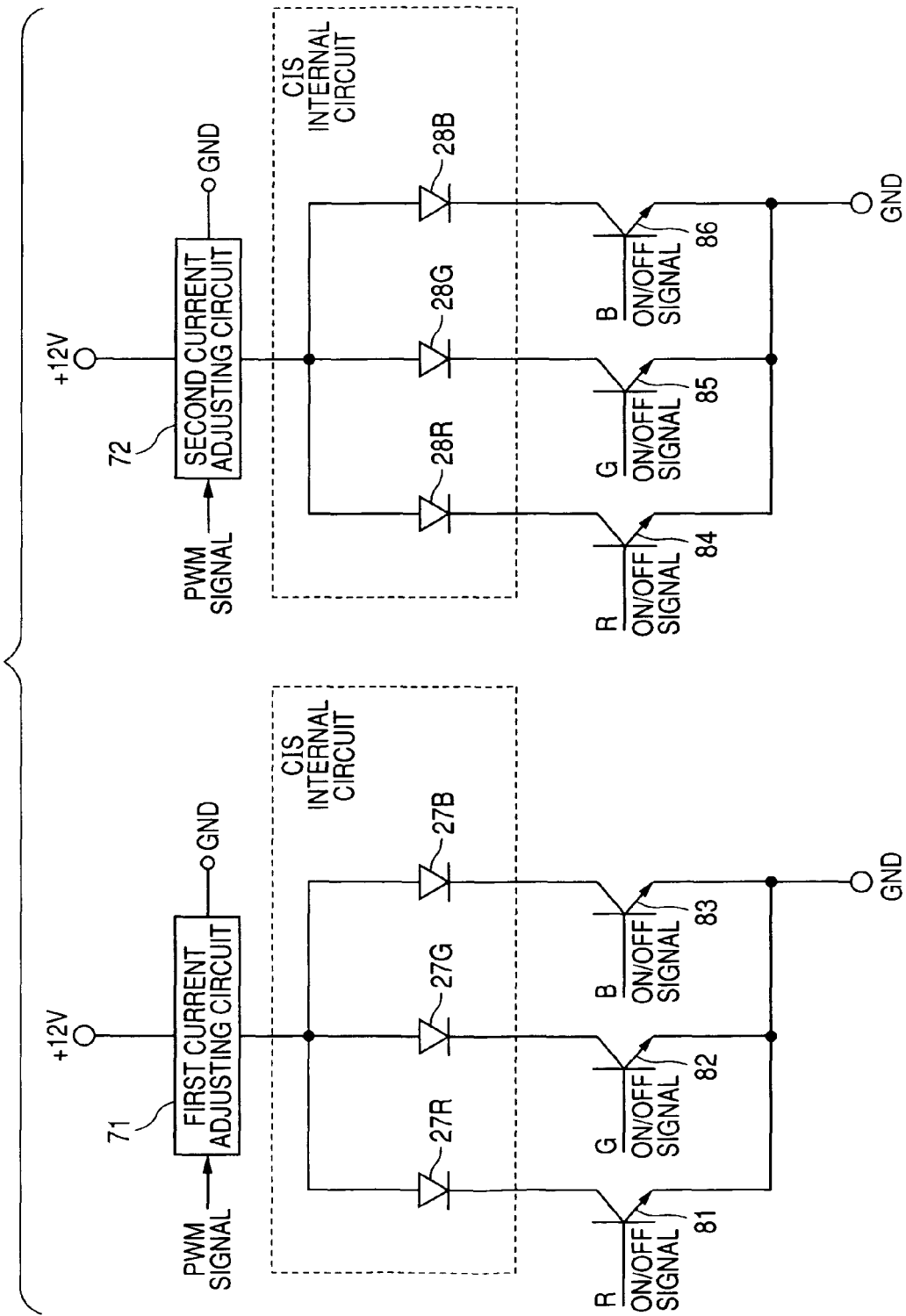
FIG. 11 is a circuit diagram showing the electrical configuration of an LED circuit in an image reading apparatus according to a second aspect.

FIG. 11 is a circuit diagram showing the electrical configuration of an LED circuit 41 in an image reading apparatus 10 according to a second aspect. The LED circuit 41 has a first current adjusting circuit 71, to which the PWM signal is input; LED chips 27R, 27G, and 27B of a left LED lamp 26a, anodes of which are connected to the first current adjusting circuit 71; a second current adjusting circuit 72, to which the PWM signal is input; LED chips 28R, 28G, and 28B of a right LED lamp 26b, anodes of which are connected to the second current adjusting circuit 72; an NPN-type control transistor 81, a collector of which is connected to a cathode of the LED chip 27R; an NPN-type control transistor 82, a collector of which is connected to a cathode of the LED chip 27G; an NPN-type control transistor 83, a collector of which is connected to a cathode of the LED chip 27B; an NPN-type control transistor 84, a collector of which is connected to a cathode of the LED chip 28R; an NPN-type control transistor 85, a collector of which is connected to a cathode of the LED chip 28G; and an NPN-type control transistor 86, a collector of which is connected to a cathode of the LED chip 28B. The first current adjusting circuit 71 and the second current adjusting circuit 72 are connected to a +12 V power source and a ground. Control signals are input to bases of the control transistors 81, 82, 83, 84, 85, and 86. Emitters of the control transistors 81, 82, 83, 84, 85, and 86 are connected to the ground.

Moreover, other parts not particularly described are the same as the corresponding parts in the image reading apparatus 10 according to the first aspect, and thus more detailed description will be omitted.

Next, the operation of the image reading apparatus 10 according to the second aspect having the above-described configuration will be described, focusing on differences from the image reading apparatus 10 according to the first aspect.

Figure 12:
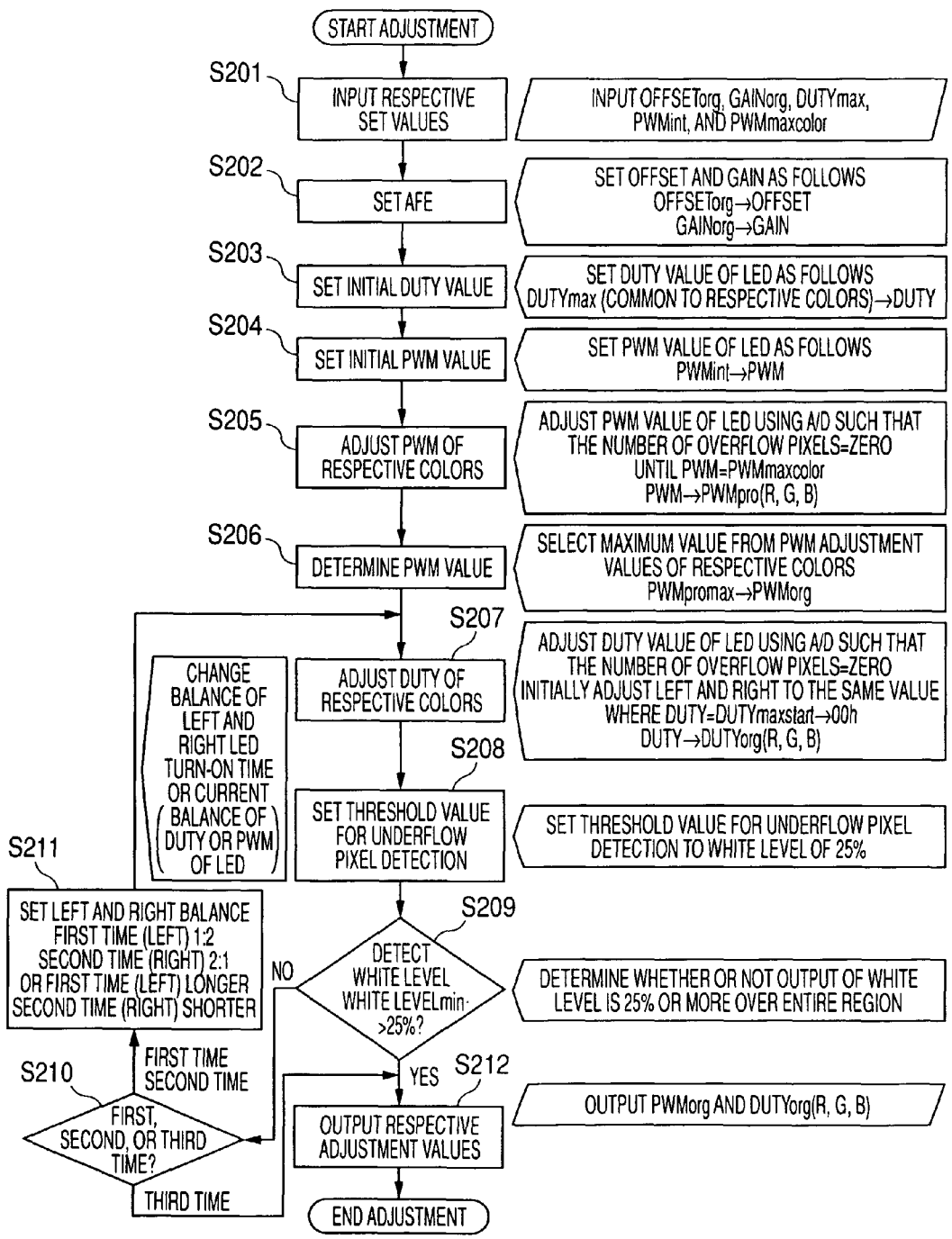
FIG. 12 is a flowchart showing a light intensity adjustment processing of each color in the image reading apparatus according to the second aspect.

FIG. 12 is a flowchart showing a light intensity adjustment processing of each color (Step S3 of FIG. 9) in the image reading apparatus 10 according to the second aspect.

At S211 of FIG. 12, in order to adjust a balance between the left and right LED lamps 26a and 26b, the CPU 50 controls either the first current adjusting circuit 71 or the second current adjusting circuit 72 to adjust the balance between the pulse width modulation values PWM of left and right LED lamps 26a and 26b for the respective colors of the LED chips 27R, 27G, and 27B and the LED chips 28R, 28G, and 28B, similar to the first aspect or the turn-on timing adjusting block 52 adjusting turn-on periods (DUTY) of LED lamps 26a and 26b for the respective colors of the LED chips 27R, 27G, and 27B and the LED chips 28R, 28G, and 28B. When adjusting the turn-on periods, specifically, the CPU 50 controls the turn-on timing adjusting block 52 to adjust the turn-on periods of LED chips 27R, 27G, 27B, 28R, 28G, and 28B by the control transistors 81 to 86, respectively. When adjusting the turn-on periods, the turn-on period of the right LED lamp is set to be longer than that of the left LED lamp at the first time, and shorter than that of the left LED lamp at the second time.

Figure 13:
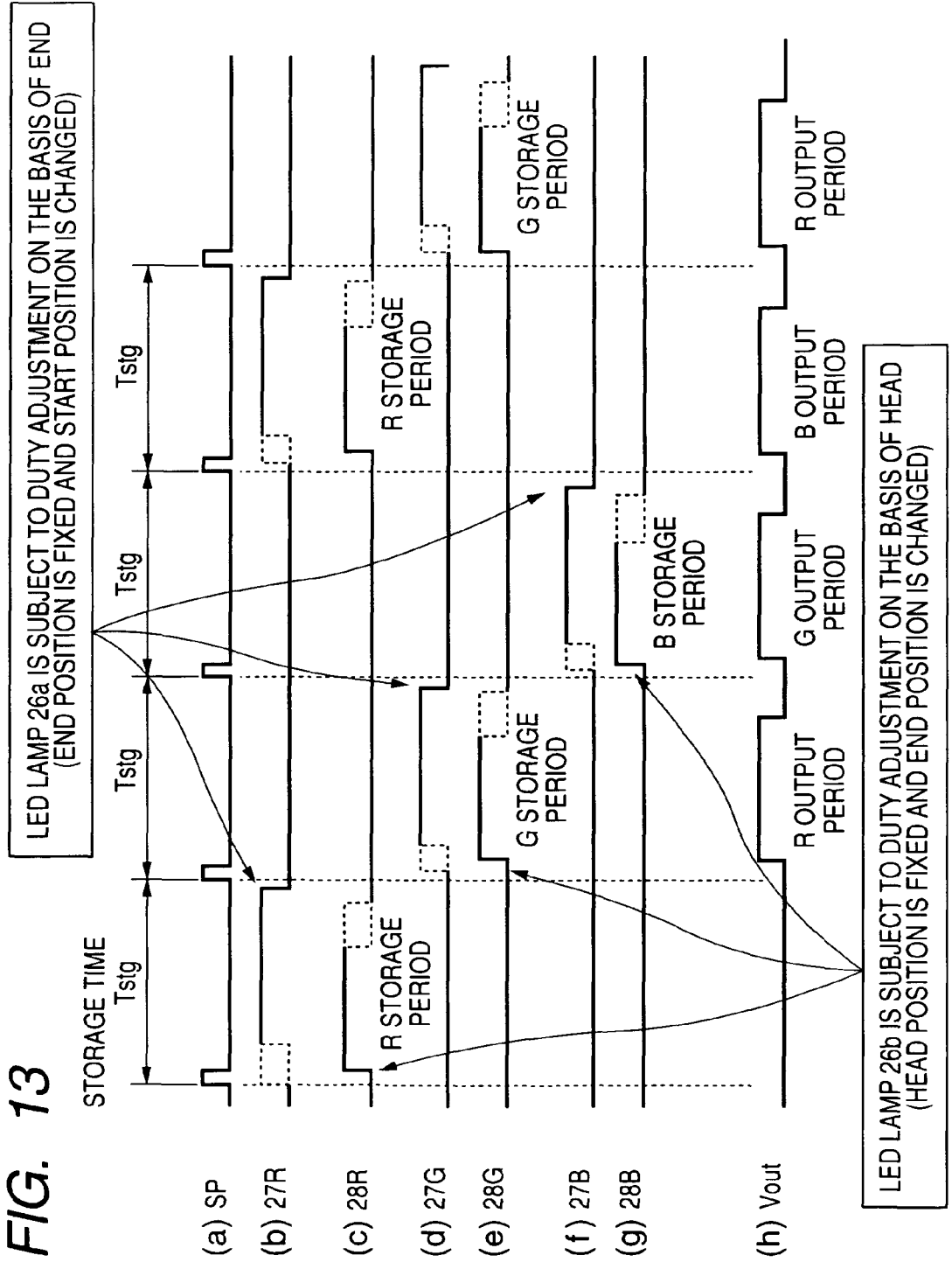
FIG. 13 is a timing chart showing the operation of the image reading apparatus according to the second aspect.

FIG. 13 is a timing chart showing the operation of the image reading apparatus 10 according to the second aspect. A unit time period Tstg denotes a time period allocated from a minimum movement period for each color. The minimum movement period is a time period for the document P to move by an amount corresponding to a maximum resolution in the sub scanning direction of the image reading apparatus 10. In the aspects of the invention described in this specification, the minimum movement period is equally allocated for three colors (red, green and blue). Therefore, Tstg is equal to ⅓ of the minimum movement period. Here, the current flowing in one LED lamp 26a and the current flowing in the other LED lamp 26b can be independently controlled. In addition, the LED chips 27R, 27G, and 27B of R, G, and B in one LED chip 26a and the LED chips 28R, 28G, and 28B of R, G, and B in the other LED chip 26b can be independently turned on/off. In FIG. 13, the LED chip 27R emits a red light for a first time period in a first unit time period, the LED chip 28R emits a red light for a second time period misaligned from the first time period in the first unit time period, the LED chip 27G emits a green light for a third time period in a second unit time period successive to the first unit time period, the LED chip 28G emits a green light for a fourth time period misaligned from the third time period in the second unit time period, the LED chip 27B emits a blue light for a fifth time period in a third unit time period successive to the second unit time period, and the LED chip 28B emits a blue light for a sixth time period in the third unit time period.

Figure 14:
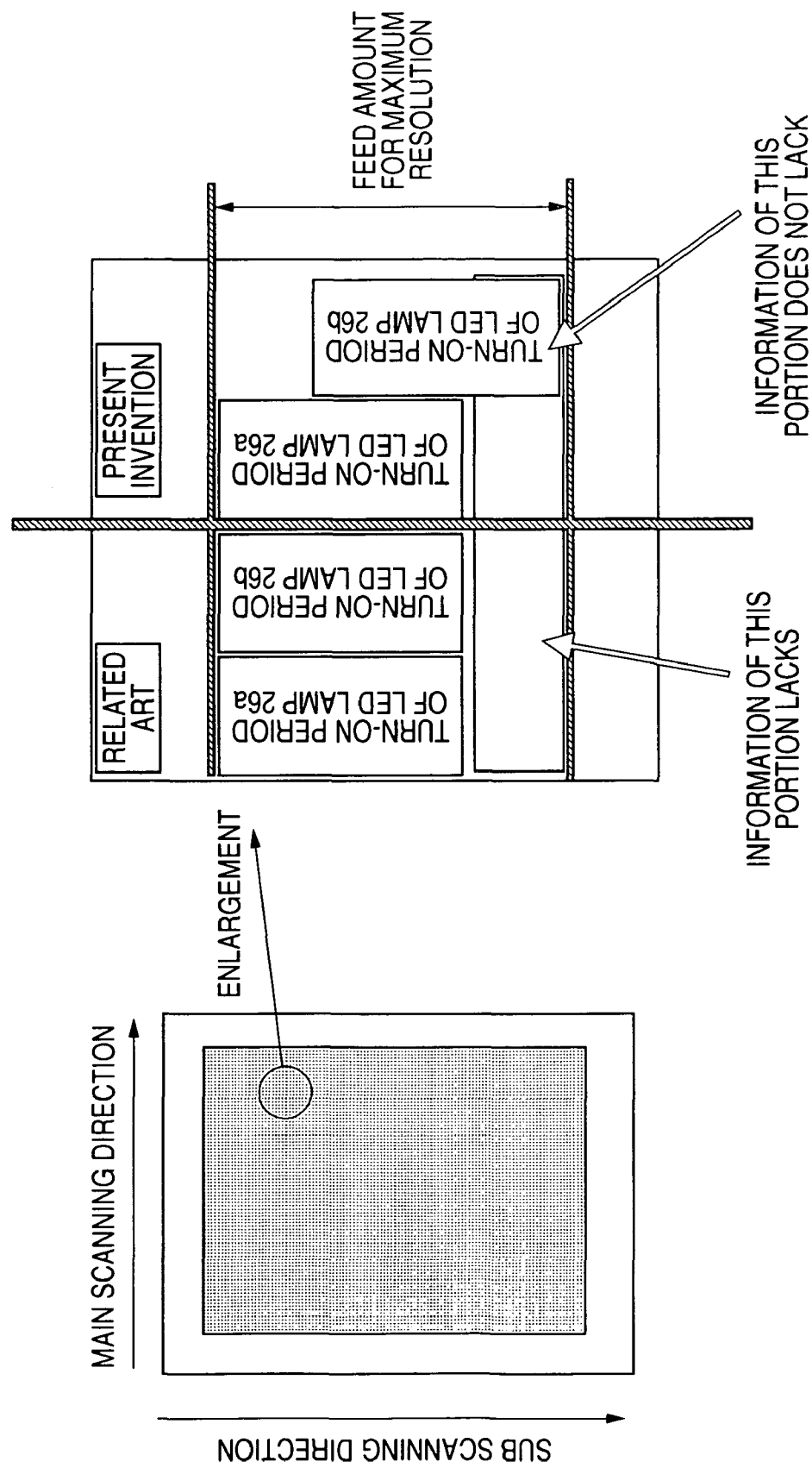
FIG. 14 is a diagram showing the image reading apparatus according to the second aspect through a comparison with a known image reading apparatus.

FIG. 14 is a diagram illustrating the effects of the image reading apparatus 10 according to the second aspect through the comparison with the known image reading apparatus. In the related art, the turn-on periods of the LED lamps 26a and 26b are aligned with each other in the sub scanning direction. Then, there is a period in which the document is not illuminated in the sub scanning direction in a range of a feed amount for maximum resolution in the sub scanning direction, which causes lack of image data when the image reading apparatus 10 reads the document. In contrast, according to the second aspect, duty adjustment is performed on the LED lamp 26a on the basis of the end and on the LED lamp 26b on the basis of the start. That is, the turn-on periods of the LED lamps 26a and 26b are misaligned with each other. Therefore, there is no period in which the document is not illuminated in the sub scanning direction in a range of the feed amount for maximum resolution in the sub scanning direction, thereby preventing lack of image data reading.

Third Aspect

Figure 15:
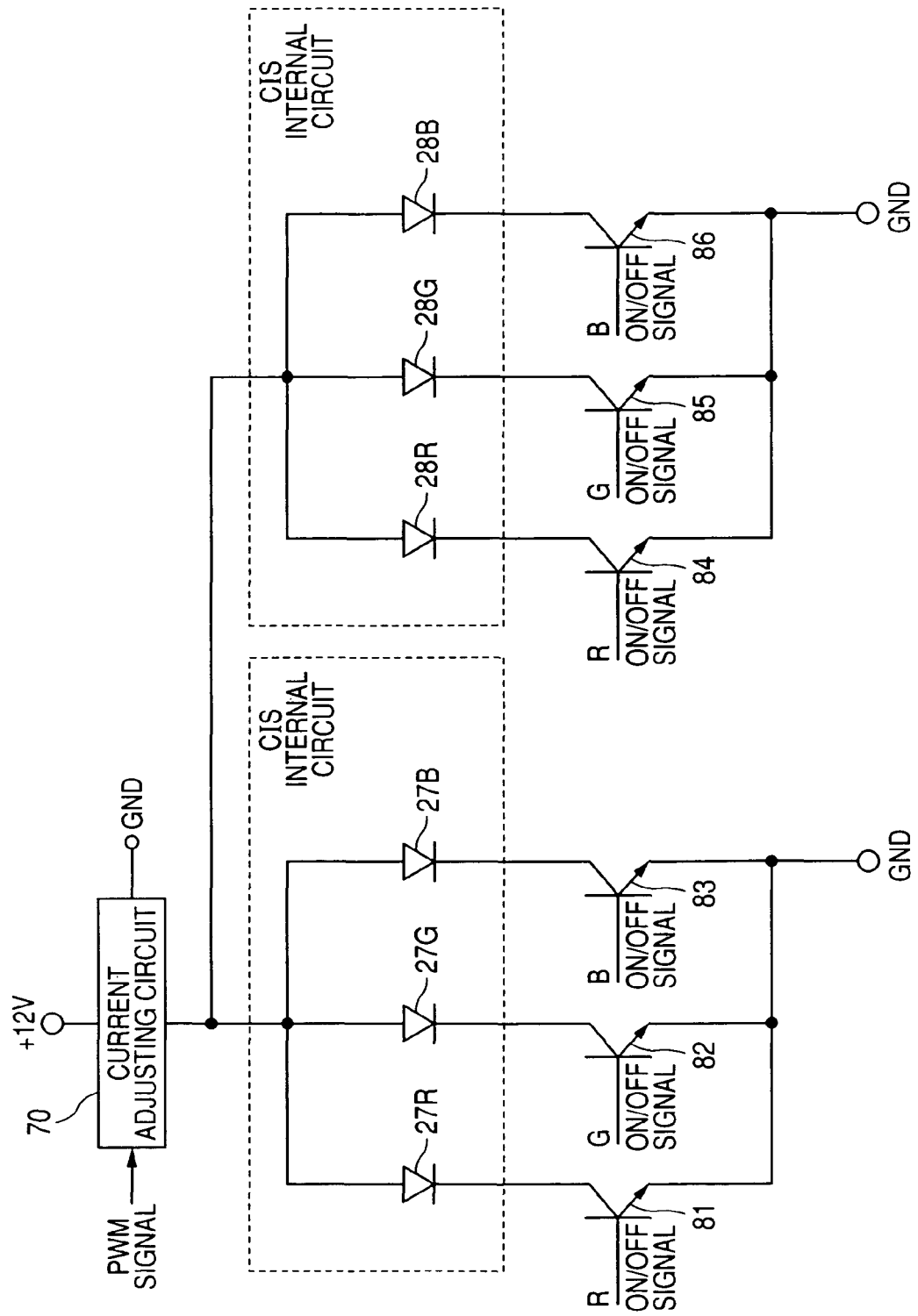
FIG. 15 is a circuit diagram showing the electrical configuration of an LED circuit in an image reading apparatus according to a third aspect.

FIG. 15 is a circuit diagram showing the electrical configuration of an LED circuit 41 in an image reading apparatus 10 according to a third aspect of the invention. The LED circuit 41 has a current adjusting circuit 70, to which the PWM signal is input, LED chips 27R, 27G, and 27B in a left LED lamp 26a, anodes of which are connected to the current adjusting circuit 70, LED chips 28R, 28G, and 28B in a right LED lamp 26b, anodes of which are connected to the current adjusting circuit 70, an NPN-type control transistor 81, a collector of which is connected to a cathode of the LED chip 27R, an NPN-type control transistor 82, a collector of which is connected to a cathode of the LED chip 27G, an NPN-type control transistor 83, a collector of which is connected to a cathode of the LED chip 27B, an NPN-type control transistor 84, a collector of which is connected to a cathode of the LED chip 28R, an NPN-type control transistor 85, a collector of which is connected to a cathode of the LED chip 28G, and an NPN-type control transistor 86, a collector of which is connected to a cathode of the LED chip 28B. The current adjusting circuit 70 is connected to a +12 V power source and a ground. Control signals are input to bases of the control transistors 81, 82, 83, 84, 85, and 86. Emitters of the control transistors 81, 82, 83, 84, 85, and 86 are connected to the ground.

Other parts not particularly described are the same as the corresponding parts in the image reading apparatus 10 according to the first aspect, and thus more detailed description will be omitted.

The operation of the image reading apparatus 10 according to the third aspect having the above-described configuration will be described, focusing on differences from the image reading apparatus 10 according to the first aspect.

Figure 16:
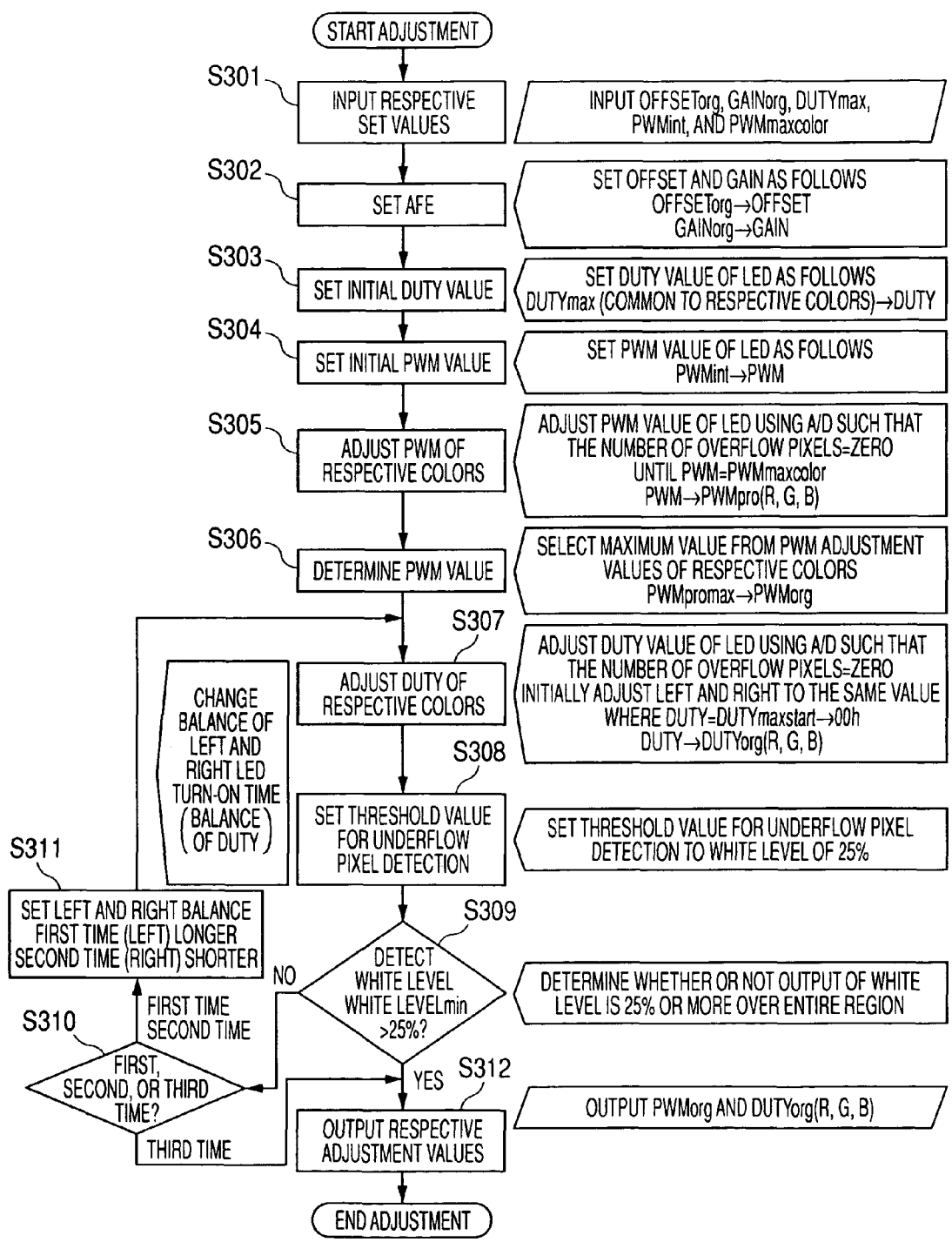
FIG. 16 is a flowchart showing a light intensity adjustment processing of each color in the image reading apparatus according to the third aspect.

FIG. 16 is a flowchart showing a light intensity adjustment processing of each color (Step S3 of FIG. 9) in the image reading apparatus 10 according to the third aspect.

At S311 of FIG. 16, in order to adjust a balance between the left and right LED lamps 26a and 26b, the CPU 50 controls the turn-on timing adjusting block 52 to adjust turn-on periods (DUTY) of LED lamps 26a and 26b for the respective colors of the LED chips 27R, 27G, and 27B and the LED chips 28R, 28G, and 28B. Specifically, the CPU 50 controls the turn-on timing adjusting block 52 to adjust the turn-on periods of LED chips 27R, 27G, 27B, 28R, 28G, and 28B by the control transistors 81 to 86, respectively. When adjusting the turn-on periods, the turn-on period of the right LED lamp is set to be longer than that of the left LED lamp at the first time, and shorter than that of the left LED lamp at the second time.

According to the third aspect, the current flowing in one LED lamp 26a and the current flowing in the other LED lamp 26b can be collectively controlled. In addition, the LED chips 27R, 27G, and 27B in one LED lamp 26a and the LED chips 28R, 28G, and 28B in the other LED lamp 26b can be independently turned on/off. For this reason, duty adjustment can be performed on the LED lamp 26a on the basis of the end and on the LED lamp 26b on the basis of the start. That is, the turn-on periods of the LED lamps 26a and 26b are misaligned with each other. Therefore, there is no period in which the document is not illuminated in the sub scanning direction in a range of the feed amount for maximum resolution in the sub scanning direction, thereby preventing lack of image data reading.

Fourth Aspect

Figure 17:
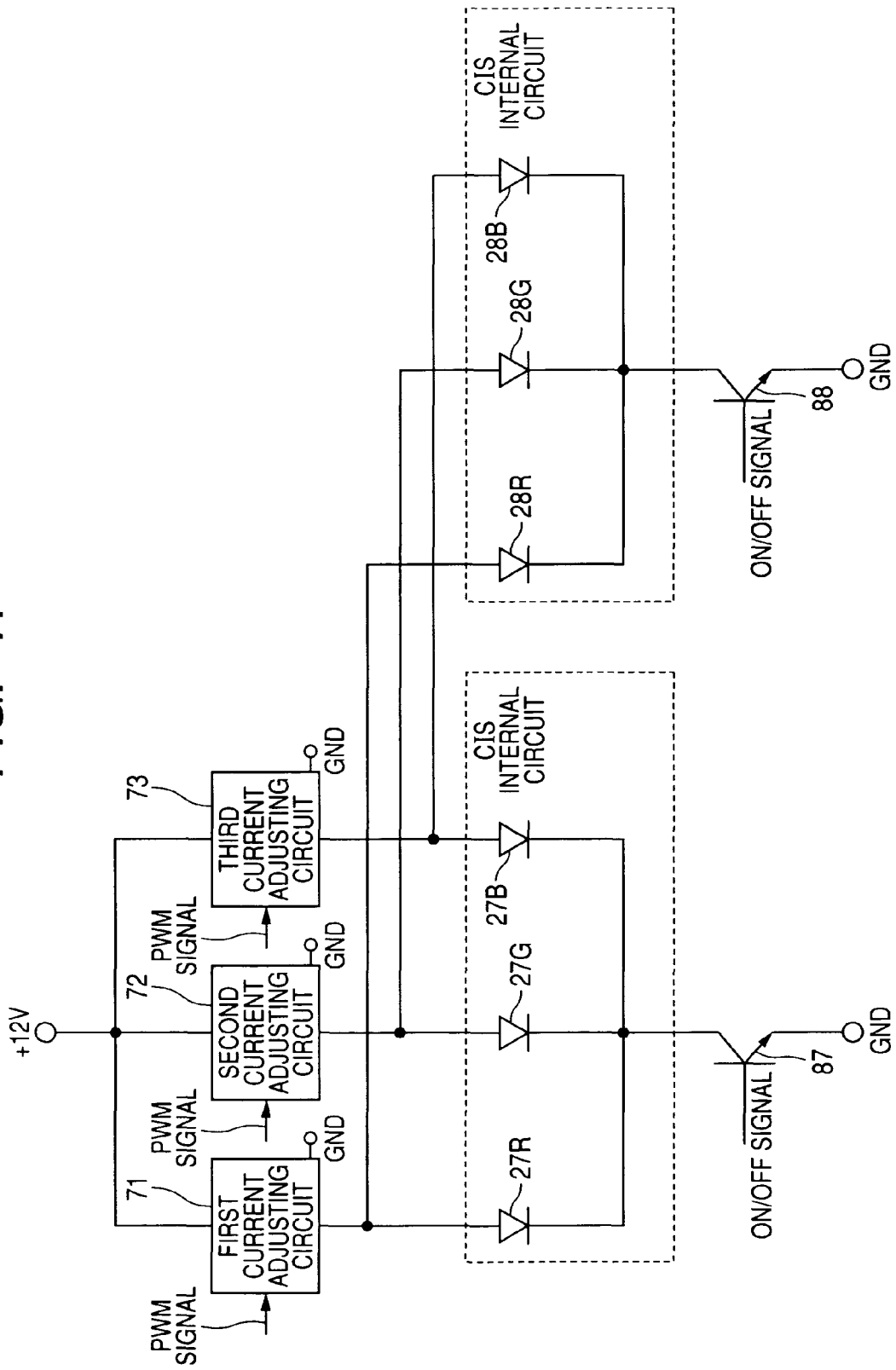
FIG. 17 is a circuit diagram showing the electrical configuration of an LED circuit in an image reading apparatus according to a fourth aspect.

FIG. 17 is a circuit diagram showing the electrical configuration of an LED circuit 41 in an image reading apparatus 10 according to a fourth aspect of the invention. The LED circuit 41 has a first current adjusting circuit 71, to which the PWM signal is input, LED chips 27R and 28R, anodes of which are connected to the first current adjusting circuit 71, a second current adjusting circuit 72, to which the PWM signal is input, LED chips 27G and 28G, anodes of which are connected to the second current adjusting circuit 72, a third current adjusting circuit 73, to which the PWM signal is input, LED chips 27B and 28B, anodes of which are connected to the third current adjusting circuit 73, an NPN-type control transistor 87, a collector of which is connected to cathodes of the LED chips 27R, 27G, and 27B, and an NPN-type control transistor 88, a collector of which is connected to cathodes of the LED chips 28R, 28G, and 28B. The first current adjusting circuit 71, the second current adjusting circuit 72, and the third current adjusting circuit 73 are connected to a +12 V power source and a ground. Control signals are input to bases of the control transistors 87 and 88. Emitters of the control transistors 87 and 88 are connected to the ground.

Other parts not particularly described are the same as the corresponding parts in the image reading apparatus 10 according to the first aspect, and thus more detailed description will be omitted.

The operation of the image reading apparatus 10 according to the fourth aspect having the above-described configuration will be described, focusing on differences from the image reading apparatus 10 according to the first aspect.

Figure 18:
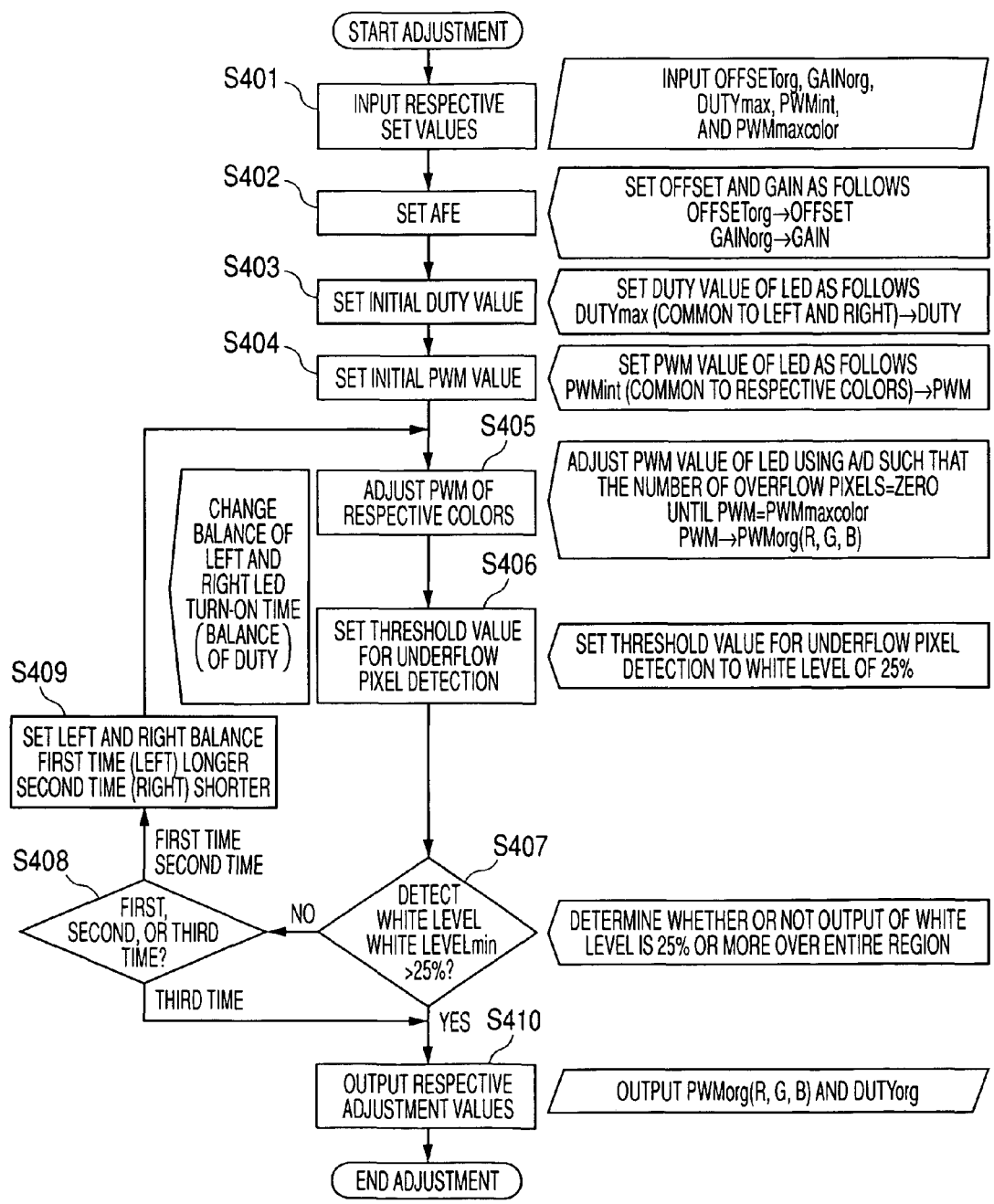
FIG. 18 is a flowchart showing a light intensity adjustment processing of each color in the image reading apparatus according to the fourth aspect.

FIG. 18 is a flowchart showing a light intensity adjustment processing of each color (Step S3 of FIG. 9) in the image reading apparatus 10 according to the fourth aspect.

At the next step of S405, different from the first aspect, the CPU 50 does not determine the pulse width modulation values PWM, and the CPU 50 sets a threshold value for underflow pixel detection of the image processing block 55 to a white level of 25%. (Step S406 of FIG. 18).

Next, since the CIS circuit 42 (the reading head 12) is located at the white member position (home position) at Step S1 of FIG. 9, the CPU 50 controls the image processing block 55 to read an image of a white member by the CIS circuit 42 through the AFE 43 so as to detect the white level (WHITE LEVELmin>25%) (Step S407 of FIG. 18). Specifically, it is determined whether of not output of the white level over the entire region is 25% or more.

When the output of the white level is not 25% or more over the entire region (Step S407 of FIG. 18: NO), the CPU 50 determines that this determination at Step S407 is the first, second, or third time (Step S408 of FIG. 18).

When it is determined that the determination is the first or second time, the CPU 50 controls the turn-on timing adjusting block 52 to adjust turn-on periods (DUTY) of LED lamps 26a and 26b for the respective colors of the LED chips 27R, 27G, and 27B and the LED chips 28R, 28G, and 28B. Specifically, the CPU 50 controls the turn-on timing adjusting block 52 to adjust the turn-on periods of LED chips 27R, 27G, 27B, 28R, 28G, and 28B by the control transistors 87, 88, respectively. When adjusting the turn-on periods, the turn-on period of the right LED lamp is set to be longer than that of the left LED lamp at the first time, and shorter than that of the left LED lamp at the second time. Thereafter, the CPU 50 returns the control to Step S405.

When it is determined that the output of white level is 25% or more over the entire region (Step S407 of FIG. 18: YES) or when setting of the left and right balance (Step S409 of FIG. 18) has been performed two times already (Step S408 of FIG. 18: third time), the CPU 50 outputs respective adjustment values of the adjustment pulse width modulation value PWMorg(R, G, B) and the adjustment duty value DUTYorg (Step S410 of FIG. 18).

According to the fourth aspect of the invention, the current flowing in the red LED lamp 27R in one LED lamp 26a and the red LED lamp 28R in the other LED lamp 26b, the current flowing in the green LED lamp 27G in one LED lamp 26a and the green LED lamp 28G in the other LED lamp 26b, and the current flowing in the blue LED lamp 27B in one LED lamp 26a and the blue LED lamp 28B in the other LED lamp 26b can be independently controlled. In addition, the LED chips 27R, 27G, and 27B of R, G, and B in one LED lamp 26a and the LED chips 28R, 28G, and 28B of R, G, and B in the other LED lamp 26b can be turned on/off according to the LED lamps 26a and 26b. For this reason, duty adjustment can be performed on the LED lamp 26a on the basis of the end and on the LED lamp 26b on the basis of the start. That is, the turn-on periods of the LED lamps 26a and 26b are misaligned with each other. Therefore, there is no period in which the document is not illuminated in the sub scanning direction in a range of the feed amount for maximum resolution in the sub scanning direction, thereby preventing lack of image data reading.

Fifth Aspect

Figure 19:
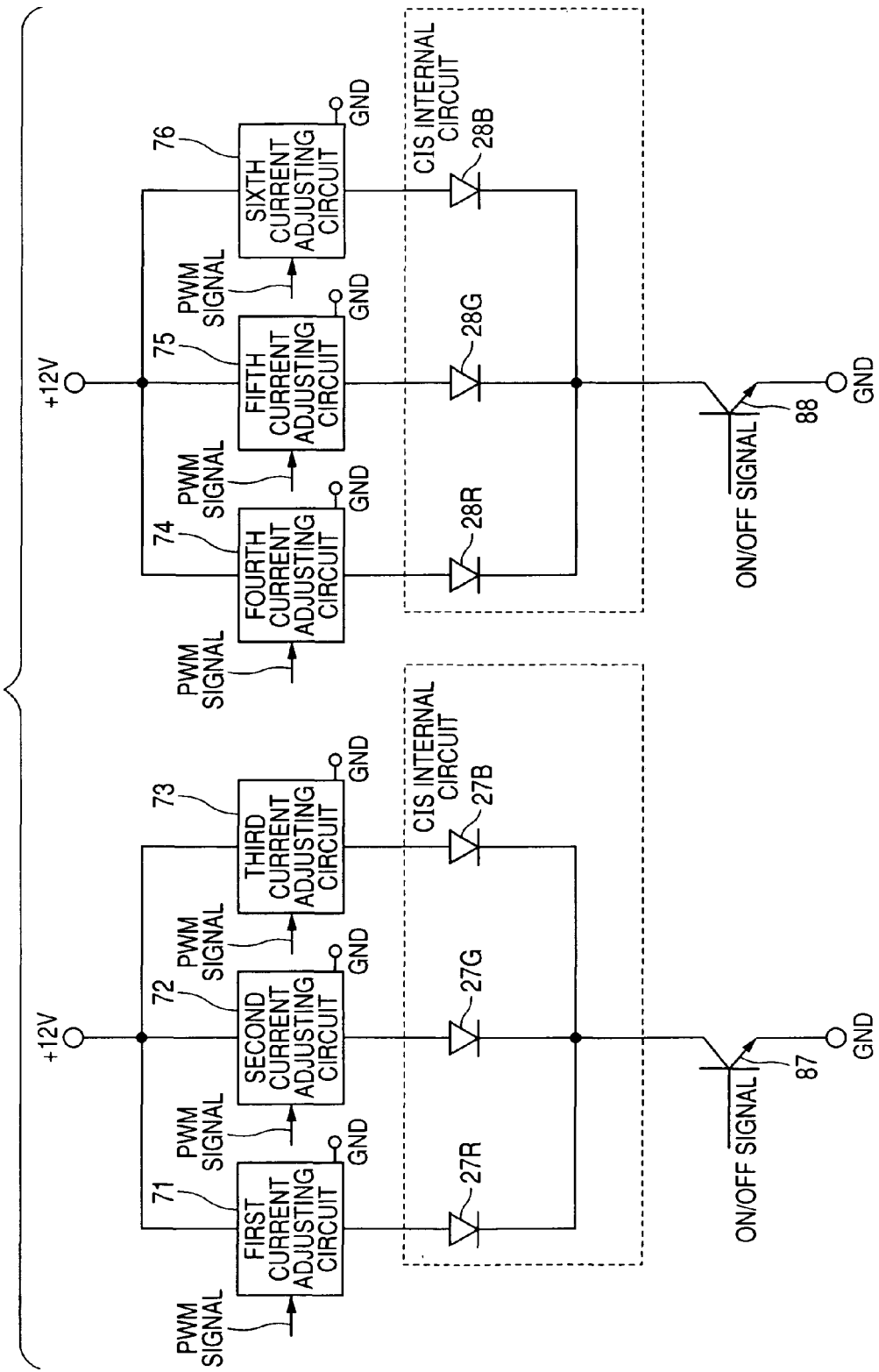
FIG. 19 is a circuit diagram showing the electrical configuration of an LED circuit in an image reading apparatus according to a fifth aspect.

FIG. 19 is a circuit diagram showing the electrical configuration of an LED circuit 41 in an image reading apparatus 10 according to a fifth aspect of the invention. The LED circuit 41 has a first current adjusting circuit 71, to which the PWM signal is input, an LED chip 27R, an anode of which is connected to the first current adjusting circuit 71, a second current adjusting circuit 72, to which the PWM signal is input, an LED chip 27G, an anode of which is connected to the second current adjusting circuit 72, a third current adjusting circuit 73, to which the PWM signal is input, an LED chip 27B, an anode of which is connected to the third current adjusting circuit 73, a fourth current adjusting circuit 74, to which the PWM signal is input, an LED chip 28R, an anode of which is connected to the fourth current adjusting circuit 74, a fifth current adjusting circuit 75, to which the PWM signal is input, an LED chip 28G, an anode of which is connected to the fifth current adjusting circuit 75, a sixth current adjusting circuit 76, to which the PWM signal is input, an LED chip 28B, an anode of which is connected to the sixth current adjusting circuit 76, an NPN-type control transistor 87, a collector of which is connected to cathodes of the LED chips 27R, 27G, and 27B, and an NPN-type control transistor 88, a collector of which is connected to cathodes of the LED chips 28R, 28G, and 28B. The first current adjusting circuit 71, the second current adjusting circuit 72, the third current adjusting circuit 73, the fourth current adjusting circuit 74, the fifth current adjusting circuit 75, and the sixth current adjusting circuit 76 are connected to a +12 V power source and a ground. Control signals are input to bases of the control transistors 87 and 88. Emitters of the control transistors 87 and 88 are connected to the ground.

Other parts not particularly described are the same as the corresponding parts in the image reading apparatus 10 according to the first aspect, and thus more detailed description will be omitted.

The operation of the image reading apparatus 10 according to the fifth aspect having the above-described configuration will be described, focusing on differences from the image reading apparatus 10 according to the first aspect.

Figure 20:
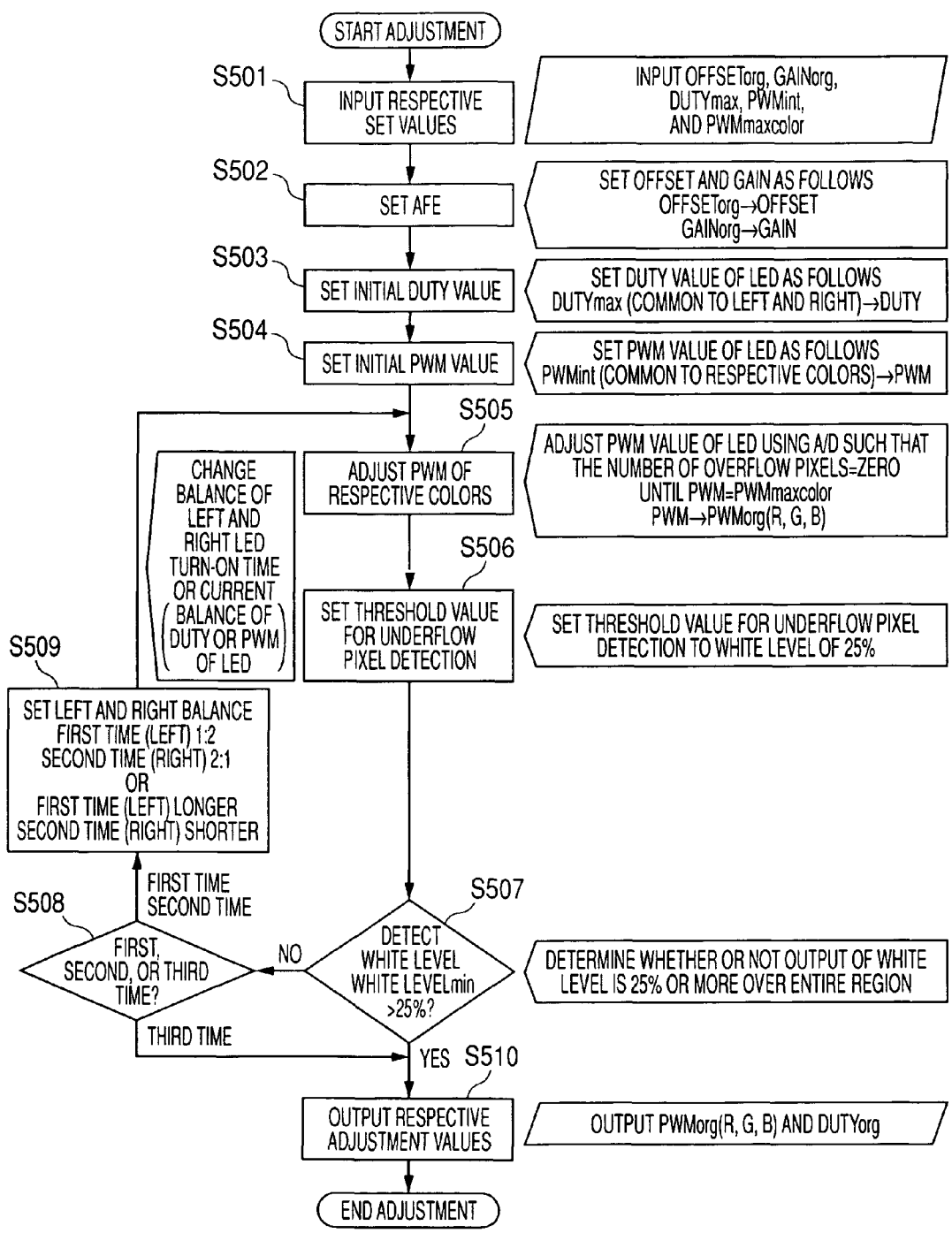
FIG. 20 is a flowchart showing a light intensity adjustment processing of each color in the image reading apparatus according to the fifth aspect.

FIG. 20 is a flowchart showing a light intensity adjustment processing of each color (Step S3 of FIG. 9) in the image reading apparatus 10 according to the fifth aspect.

At the next step of S505, different from the first aspect, the CPU 50 does not determine the pulse width modulation value PWM, and the CPU 50 sets a threshold value for underflow pixel detection of the image processing block 55 to a white level of 25% (Step S506 of FIG. 20).

Next, since the CIS circuit 42 (the reading head 12) is located at the white member position (home position) at Step S1 of FIG. 9, the CPU 50 controls the image processing block 55 to read an image of a white member by the CIS circuit 42 through the AFE 43 so as to detect the white level (WHITE LEVELmin>25%) (Step S507 of FIG. 20). Specifically, it is determined whether of not output of the white level over the entire region is 25% or more.

When the output is not 25% or more over the entire region (Step S507 of FIG. 20: NO), the CPU 50 determines that this determination at Step S507 is the first, second, or third time (Step S508 of FIG. 20). When it is the third time, the CPU 50 progresses the control to Step S510.

When it is determined that the determination is the first or second time, the CPU 50 either controls the PWM waveform generating block 53 to adjust a balance between the pulse width modulation values PWM of the left and right LED lamps 26a and 25b similar to the first aspect or controls turn-on timing adjusting block 52 to adjust a balance between the left and right LED lamps 26a and 26b by changing turn-on periods (DUTY) of LED lamps 26a and 26b for the respective colors of the LED chips 27R, 27G, and 27B and the LED chips 28R, 28G, and 28B. When changing the turn-on periods, specifically, the CPU controls the timing adjusting block 52 to adjust the turn-on periods of LED chips 27R, 27G, 27B, 28R, 28G, and 28B by the control transistors 87 and 88, respectively. When changing the turn-on periods, the turn-on period of the right LED lamp is set to be longer than that of the left LED lamp at the first time, and shorter than that of the left LED lamp at the second time. Thereafter, the CPU 50 returns the control to Step S505.

When it is determined that the output of white level is 25% or more over the entire region (Step S507 of FIG. 20: YES) or when setting of the left and right balance (Step S509 of FIG. 20) has been performed two times already (Step S508 of FIG. 20: third time), the CPU 50 outputs respective adjustment values of the adjustment pulse width modulation value PWMorg(R, G, B) and the adjustment duty value DUTYorg (Step S510 of FIG. 20).

According to the fifth aspect, the current flowing in the LED chips 27R, 27G, and 27B of R, G, and B in one LED lamp 26a and the current flowing in the LED chips 28R, 28G, and 28B of R, G, and B in the other LED lamp 26b can be independently controlled. In addition, the LED chips 27R, 27G, and 27B of R, G, and B in one LED lamp 26a and the LED chips 28R, 28G, and 28B of R, G, and B in the other LED lamp 26b can be turned on/off according to the LED lamps 26a and 26b. For this reason, duty adjustment can be performed on the LED lamp 26a on the basis of the end and on the LED lamp 26b on the basis of the start. That is, the turn-on periods of the LED lamps 26a and 26b are misaligned with each other. Therefore, there is no period in which the document is not illuminated in the sub scanning direction in a range of the feed amount for maximum resolution in the sub scanning direction, thereby preventing lack of image data reading.

Sixth Aspect

Figure 21:
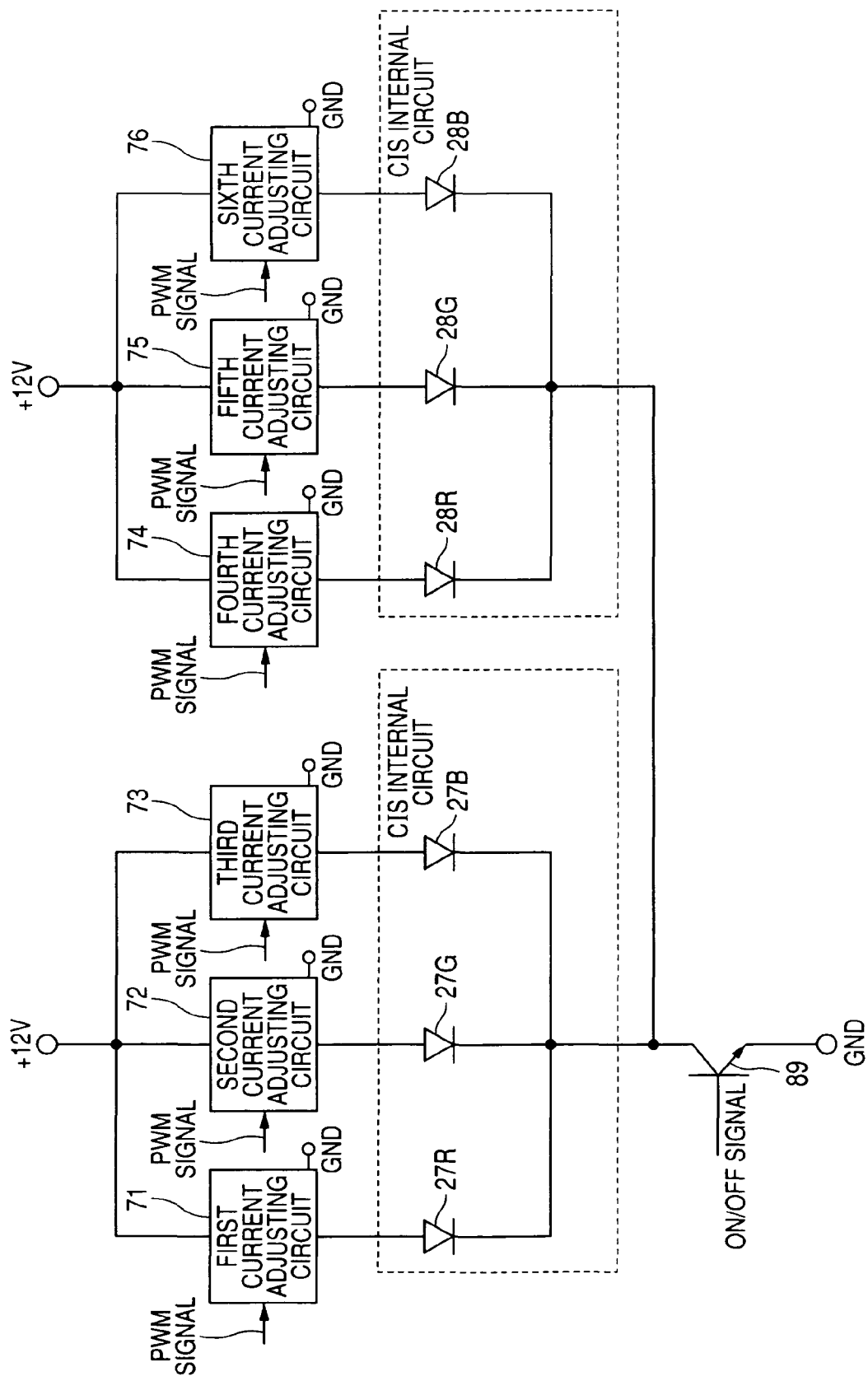
FIG. 21 is a circuit diagram showing the electrical configuration of an LED circuit in an image reading apparatus according to a sixth aspect.

FIG. 21 is a circuit diagram showing the electrical configuration of an LED circuit 41 in an image reading apparatus 10 according to a sixth aspect of the invention. The LED circuit 41 has a first current adjusting circuit 71, to which the PWM signal is input, an LED chip 27R, an anode of which is connected to the first current adjusting circuit 71, a second current adjusting circuit 72, to which the PWM signal is input, an LED chip 27G, an anode of which is connected to the second current adjusting circuit 72, a third current adjusting circuit 73, to which the PWM signal is input, an LED chip 27B, an anode of which is connected to the third current adjusting circuit 73, a fourth current adjusting circuit 74, to which the PWM signal is input, an LED chip 28R, an anode of which is connected to the fourth current adjusting circuit 74, a fifth current adjusting circuit 75, to which the PWM signal is input, an LED chip 28G, an anode of which is connected to the fifth current adjusting circuit 75, a sixth current adjusting circuit 76, to which the PWM signal is input, an LED chip 28B, an anode of which is connected to the sixth current adjusting circuit 76, and an NPN-type control transistor 89, a collector of which is connected to cathodes of the LED chips 27R, 27G, and 27B and the LED chips 28R, 28G, and 28B. The first current adjusting circuit 71, the second current adjusting circuit 72, the third current adjusting circuit 73, the fourth current adjusting circuit 74, the fifth current adjusting circuit 75, and the sixth current adjusting circuit 76 are connected to a +12 V power source and a ground. A control signal is input to a base of the control transistor 89. An emitter of the control transistor 89 is connected to the ground.

Other parts not particularly described are the same as the corresponding parts in the image reading apparatus 10 according to the first aspect, and thus more detailed description will be omitted.

The operation of the image reading apparatus 10 according to the sixth aspect having the above-described configuration will be described, focusing on differences from the image reading apparatus 10 according to the first aspect.

Figure 22:
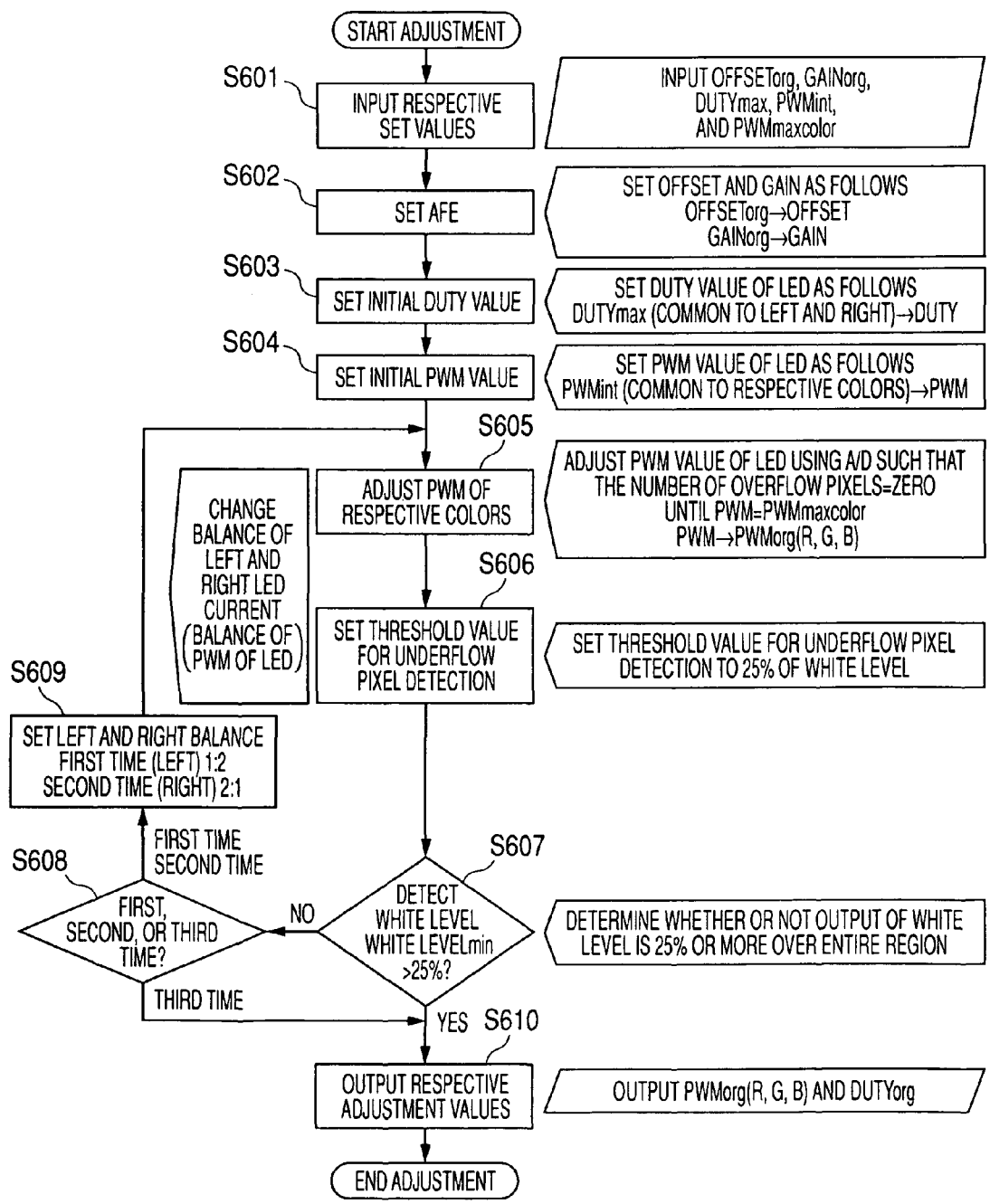
FIG. 22 is a flowchart showing a light intensity adjustment processing of each color in the image reading apparatus according to the sixth aspect.

FIG. 22 is a flowchart showing a light intensity adjustment processing of each color (Step S3 of FIG. 9) in the image reading apparatus 10 according to the sixth aspect.

At the next step of S605, different from the first aspect, the CPU 50 does not determines the pulse width modulation values PWM, and the CPU 50 sets a threshold value for underflow pixel detection of the image processing block 55 to a white level of 25% (Step S606 of FIG. 22).

Next, since the CIS circuit 42 (the reading head 12) is located at the white member position (home position) at Step S1 of FIG. 9, the CPU 50 controls the image processing block 55 to read an image of a white member by the CIS circuit 42 through the AFE 43 so as to detect the white level (WHITE LEVELmin>25%) (Step S607 of FIG. 22). Specifically, it is determined whether of not output of the white level over the entire region is 25% or more.

When the output of the white level is not 25% or more over the entire region (Step S607 of FIG. 22: NO), the CPU 50 determines that this determination at Step S607 is the first, second or third time (Step S608 of FIG. 22). When it is the third time, the CPU 50 progresses the control to Step S610.

When it is determined that the determination is the first or second time, the CPU 50 controls the PWM waveform generating block 53 to adjust a balance between the pulse width modulation values PWM of left and right LED lamps 26a and 26b for the respective colors of the LED chips 27R, 27G and 27B and the LED chips 28R, 28G, and 28B (Step S609 of FIG. 22). Specifically, the balance of left and right LED current is changed such that a ratio of the left and right LED current is 1:2 at the first time (left) and 2:1 at the second time (right). Thereafter, the CPU 50 returns the control to Step S605.

When it is determined that the output of white level is 25% or more over the entire region (Step S607 of FIG. 22: YES) or when setting of the left and right balance (Step S609 of FIG. 22) has been performed two times already (Step S608 of FIG. 22: third time), the CPU 50 outputs respective adjustment values of the adjustment pulse width modulation value PWMorg(R, G, B) and the adjustment duty value DUTYorg (Step S610 of FIG. 22).

According to the sixth aspect, the current flowing in the LED chips 27R, 27G, and 27B of R, G, and B in one LED lamp 26a and the current flowing in the LED chips 28R, 28G, and 28B of R, G, and B in the other LED lamp 26b can be independently controlled. In addition, the LED chips 27R, 27G, and 27B in one LED lamp 26a and the LED chips 28R, 28G, and 28B of R, G, and B in the other LED lamp 26b can be collectively turned on/off.

Although above aspects have been described, the aspects are just illustrative, and the invention is not limited thereto. Various modifications can be made on the basis of the knowledge of those skilled in the art without departing from the spirit and scope of the appended claims.

For example, according to the above described aspects, two LED lamps are arranged on both side of the light guide member. However, the two LED lamps may be arranged on one side of the light guide member.

Moreover, according to the above described aspects, the image reading apparatus includes two LED lamps. The image reading apparatus may include three LED lamps. When the image reading apparatus includes three LED lamps, the turn-on period of one LED lamp in a time period may be set based on the start thereof, the turn-on period of another LED lamp in the time period may be set based on the center thereof, and the turn-on period of the other LED lamp in the time period may be set based on the end thereof.

What is claimed is:

1. An image reading apparatus comprising:
first and second light emitters that emit lights having the same color;
a light guide unit that guides the lights emitted from the first and second light emitters to irradiate a document with the light;
a photoelectric conversion unit that converts reflected light from the document into an image signal; and
a control unit that controls the first light emitter to emit light for a first time period in a unit time period and controls the second light emitter to emit light for a second time period misaligned from the first time period in the unit time period.

2. An image reading apparatus comprising:
a first LED that emits a light with a first color;
a second LED that emits a light with a second color;
a third LED that emits a light with the first color;
a fourth LED that emits a light with the second color;
a light guide unit that guides the lights emitted from the first to fourth LEDs to irradiate a document with the light;
a photoelectric conversion unit that converts reflected light from the document into an image signal; and
a control unit that controls the first LED to emit light for a first time period in a first unit time period, controls the second LED to emit light for a second time period misaligned from the first time period in the first unit time period, controls the third LED to emit light for a third time period in a second unit time period successive to the first unit time period and controls the fourth LED to emit light for a fourth time period misaligned from the third time period in the second unit time.

3. The image reading apparatus according to claim 2, wherein the control unit includes:
a first circuit that controls intensities and emitting timings of the lights emitted from the first and second LEDs;
a second circuit that controls intensities and emitting timings of the lights emitted from the third and fourth LEDs;
a first control switch that controls the emitting timings of the lights emitted from the first and third LEDs; and
a second control switch that controls the emitting timings of the lights emitted from the second and fourth LEDs.

4. The image reading apparatus according to claim 2, wherein the control unit includes:
a first circuit that controls intensities and emitting timings of the lights emitted from the first and second LrDs;
a second circuit that controls intensities and emitting timings of the lights emitted from the third and fourth LEDs;
a first control switch that controls the emitting timings of the light emitted from the first LED;
a second control switch that controls the emitting timings of the light emitted from the second LED;

a third control switch that controls the emitting timings of the light emitted from the third LED; and
a fourth control switch that controls the emitting timings of the light emitted from the fourth LED.

5. The image reading apparatus according to claim 2, wherein the control unit includes:
a first circuit that controls intensities and emitting timings of the lights emitted from the first to fourth LEDs;
a first control switch that controls the emitting timing of the light emitted from the first LED;
a second control switch that controls the emitting timing of the light emitted from the second LED;
a third control switch that controls the emitting timing of the light emitted from the third LED; and
a fourth control switch that controls the emitting timing of the light emitted from the fourth LED.

6. The image reading apparatus according to claim 2, wherein the control unit includes:
a first circuit that controls intensities and emitting timings of the lights emitted from the first and third LEDs;
a second circuit that controls intensities and emitting timings of the lights emitted from the second and fourth LEDs;
a first control switch that controls the emitting timings of the lights emitted from the first and second LEDs; and
a second control switch that controls the emitting timings of the lights emitted from the third and fourth LEDs.

7. The image reading apparatus according to claim 2, wherein the control unit includes:
a first circuit that controls an intensity and an emitting timing of the light emitted from the first LED;
a second circuit that controls an intensity and an emitting timing of the light emitted from the second LED;
a third circuit that controls an intensity and an emitting timing of the light emitted from the third LED;
a fourth circuit that controls an intensity and an emitting timing of the light emitted from the fourth LED;
a first control switch that controls the emitting timings of the lights emitted from the first and second LEDs; and
a second control switch that controls the emitting timings of the lights emitted from the third and fourth LEDs.

8. The image reading apparatus according to claim 2, wherein the control unit includes:
a first circuit that controls an intensity and an emitting timing of the light emitted from the first LED;
a second circuit that controls an intensity and an emitting timing of the light emitted from the second LED;
a third circuit that controls an intensity and an emitting timing of the light emitted from the third LED;
a fourth circuit that controls an intensity and an emitting timing of the light emitted form the fourth LED; and
a first control switch that controls the emitting timings of the lights emitted from the first to fourth LEDs.

9. A light intensity control circuit for an image reading apparatus, the image reading apparatus including first and second light emitters that emit lights, a light guide unit that guides the lights emitted from the first and second light emitters to irradiate a document with the light, and a photoelectric conversion unit that converts reflected light from the document into an image signal, the light intensity control circuit comprising:
a control unit that controls the first light emitter to emit light for a first time period in a unit time period and controls the second light emitter to emit light for a second time period misaligned from the first time period in the unit time period, wherein each of the first and second light emitters emits light having the same color.

10. A light intensity control circuit for an image reading apparatus, the image reading apparatus including a first LED that emits a light with a first color, a second LED that emits a light with a second color, a third LED that emits a light with the first color, a fourth LED that emits a light with the second color, a light guide unit that guides the lights emitted from the first to fourth LEDs to irradiate a document with the light, and a photoelectric conversion unit that converts reflected light from the document into an image signal, the light intensity control circuit comprising:
a control unit that controls the first LED to emit light for a first time period in an first unit time period, controls the second LED to emit light for a second time period misaligned from the first time period in the first unit time period, controls the third LED to emit light for a third time period in a second unit time period successive to the first unit time period and controls the fourth LED to emit light for a fourth time period misaligned from the third time period in the second unit time.

11. The image reading apparatus according to claim 10, wherein the control unit includes:
a first circuit that controls intensities and emitting timings of the lights emitted from the first and second LEDs;
a second circuit that controls intensities of emitting timings of the lights emitted from the third and fourth LEDs;
a first control switch that controls the emitting timings of the lights emitted from the first and third LEDs; and
a second control switch that controls the emitting timings of the lights emitted from the second and fourth LEDs.

12. The image reading apparatus according to claim 10, wherein the control unit includes:
a first circuit that controls intensities and emitting timings of the lights emitted from the first and second LEDs;
a second circuit that controls intensities and emitting timings of the lights emitted from the third and fourth LEDs;
a first control switch that controls the emitting timings of the light emitted from the first LED;
a second control switch that controls the emitting timings of the light emitted from the second LED;
a third control switch that controls the emitting timings of the light emitted from the third LED; and
a fourth control switch that controls the emitting timings of the light emitted from the fourth LED.

13. The image reading apparatus according to claim 10, wherein the control unit includes:
a first circuit that controls intensities and emitting timings of the lights emitted from the first to fourth LEDs;
a first control switch that controls the emitting timing of the light emitted from the first LED;
a second control switch that controls the emitting timing of the light emitted from the second LED;
a third control switch that controls the emitting timing of the light emitted from the third LED; and
a fourth control switch that controls the emitting timing of the light emitted from the fourth LED.

14. The image reading apparatus according to claim 10, wherein the control unit includes:
a first circuit that controls intensities and emitting timings of the lights emitted from the first and third LEDs;
a second circuit that controls intensities and emitting timings of the lights emitted from the second and fourth LEDs;
a first control switch that controls the emitting timings of the lights emitted from the first and second LEDs; and
a second control switch that controls the emitting timings of the lights emitted from the third and fourth LEDs.

15. The image reading apparatus according to claim 10, wherein the control unit includes:
- a first circuit that controls an intensity and an emitting timing of the light emitted from the first LED;
- a second circuit that controls an intensity and an emitting timing of the light emitted from the second LED;
- a third circuit that controls an intensity and an emitting timing of the light emitted from the third LED;
- a fourth circuit that controls an intensity and an emitting timing of the light emitted from the fourth LED;
- a first control switch that controls the emitting timings of the lights emitted from the first and second LEDs; and
- a second control switch that controls the emitting timings of the lights emitted from the third and fourth LEDs.

16. The image reading apparatus according to claim 10, wherein the control unit includes:
- a first circuit that controls an intensity and an emitting timing of the light emitted from the first LED;
- a second circuit that controls an intensity and an emitting timing of the light emitted from the second LED;
- a third circuit that controls an intensity and an emitting timing of the light emitted from the third LED;
- a fourth circuit that controls an intensity and an emitting timing of the light emitted from the fourth LED; and
- a first control switch that controls the emitting timings of the lights emitted from the first to fourth LEDs.

17. A light intensity control method comprising:
- emitting a first light from a first light emitter for a first time period in a unit time period;
- emitting a second light from a second light emitter for a second time period misaligned from the first time period in the unit time period, wherein the second light is the same color as the first light;
- guiding the emitted lights to irradiate a document; and
- converting reflected light of the emitted lights reflected from the document into an image signal.

18. A light intensity control method comprising:
- emitting a first light with a first color from a first LED for a first time period in a first unit time period;
- emitting a second light with a second color from a second LED for a second time period misaligned from the first time period in the first unit time period;
- emitting a third light with the first color from a third LED for a third time period in a second unit time period successive to the first unit time period;
- emitting a fourth light with the second color from a fourth LED for a fourth time period misaligned from the third time period in the second unit time period;
- guiding the emitted lights to irradiate a document; and
- converting reflected light of the emitted lights reflected from the document into an image signal.

* * * * *